United States Patent
Lodin et al.

(10) Patent No.: US 11,162,789 B2
(45) Date of Patent: Nov. 2, 2021

(54) ESTIMATION OF SPATIAL PROFILE OF ENVIRONMENT

(71) Applicant: Baraja Pty Ltd, Lindfield West (AU)

(72) Inventors: Rebecca Lodin, Lindfield West (AU); Cibby Pulikkaseril, Lindfield West (AU); Federico Collarte Bondy, Lindfield West (AU)

(73) Assignee: BARAJA PTY LTD, Lindfield (AU)

( * ) Notice: Subject to any disclaimer, the term of this patent is extended or adjusted under 35 U.S.C. 154(b) by 312 days.

(21) Appl. No.: 16/467,319

(22) PCT Filed: Dec. 15, 2017

(86) PCT No.: PCT/AU2017/051395
§ 371 (c)(1),
(2) Date: Jun. 6, 2019

(87) PCT Pub. No.: WO2018/107237
PCT Pub. Date: Jun. 21, 2018

(65) Prior Publication Data
US 2019/0310377 A1    Oct. 10, 2019

(30) Foreign Application Priority Data

Dec. 16, 2016    (AU) ................................ 2016905228

(51) Int. Cl.
*G01C 15/00*    (2006.01)
*G01S 7/481*    (2006.01)
(Continued)

(52) U.S. Cl.
CPC .............. *G01C 15/002* (2013.01); *G01J 3/00* (2013.01); *G01S 7/481* (2013.01); *G01S 7/4811* (2013.01);
(Continued)

(58) Field of Classification Search
None
See application file for complete search history.

(56) References Cited

U.S. PATENT DOCUMENTS 5,583,683 A    12/1996  Scobey
5,877,851 A    3/1999   Stann et al.
(Continued)

FOREIGN PATENT DOCUMENTS

DE    4427352 C1    1/1996
EP    0164181 A2    12/1985
(Continued)

OTHER PUBLICATIONS

Wanatabe et al., "Low-loss wavelength routing optical switch consisting of small matrix switch and cyclic arrayed-waveguide gratings for colorless add/drop," *Jpn. J. of App. Phys.*, 53 08MB02, 2014.
(Continued)

*Primary Examiner* — Eric L Bolda
(74) *Attorney, Agent, or Firm* — Kilpatrick Townsend & Stockton LLP

(57) ABSTRACT

Disclosed herein is a system and method for facilitating estimation of a spatial profile of an environment based on a light detection and ranging (LiDAR) based technique. In one arrangement, the present disclosure facilitates spatial profile estimation based on directing light over one dimension, such as along the vertical direction. In another arrangement, by further directing the one-dimensionally directed light in another dimension, such as along the horizontal direction, the present disclosure facilitates spatial profile estimation based on directing light in two dimensions.

20 Claims, 20 Drawing Sheets

(51) Int. Cl.
*G01S 17/32* (2020.01)
*G01S 17/88* (2006.01)
*G01S 17/66* (2006.01)
*G01J 3/00* (2006.01)
*G01S 17/93* (2020.01)

(52) U.S. Cl.
CPC .............. *G01S 17/32* (2013.01); *G01S 17/66* (2013.01); *G01S 17/88* (2013.01); *G01S 17/93* (2013.01)

(56) References Cited

U.S. PATENT DOCUMENTS

| | | |
|---|---|---|
| 6,031,658 A | 2/2000 | Riza |
| 6,147,760 A | 11/2000 | Geng |
| 6,263,127 B1 | 7/2001 | Dragone et al. |
| 6,339,661 B1 | 1/2002 | Kokkelink et al. |
| 6,377,720 B1 | 4/2002 | Kokkelink |
| 6,687,036 B2 | 2/2004 | Riza |
| 7,532,311 B2 | 5/2009 | Henderson et al. |
| 7,804,056 B2 | 9/2010 | Bishop |
| 7,831,298 B1 | 11/2010 | Wang et al. |
| 7,969,558 B2 | 6/2011 | Hall |
| 7,986,397 B1 | 7/2011 | Tiemann et al. |
| 8,159,680 B2 | 4/2012 | Robinson et al. |
| 8,440,952 B2 | 5/2013 | Jalali et al. |
| 8,599,381 B2 | 12/2013 | Statz et al. |
| 8,701,482 B2 | 4/2014 | Tsadka et al. |
| 9,246,589 B2 | 1/2016 | Koonen et al. |
| 2002/0126945 A1 | 9/2002 | Konishi et al. |
| 2004/0086214 A1 | 5/2004 | Huang et al. |
| 2005/0024640 A1 | 2/2005 | Fataley et al. |
| 2007/0103699 A1* | 5/2007 | Kohnen .................. G01S 17/42 356/620 |
| 2007/0177841 A1 | 8/2007 | Danziger |
| 2011/0106324 A1 | 5/2011 | Tsadka et al. |
| 2013/0242400 A1 | 9/2013 | Chen |
| 2014/0078298 A1 | 3/2014 | Kudenov et al. |
| 2015/0043009 A1 | 2/2015 | Bridges et al. |
| 2015/0086198 A1 | 3/2015 | Frisken et al. |
| 2015/0192677 A1 | 7/2015 | Yu et al. |
| 2017/0153319 A1* | 6/2017 | Villeneuve ............ G01S 7/4804 |

FOREIGN PATENT DOCUMENTS

| | | |
|---|---|---|
| EP | 0811855 A2 | 12/1997 |
| EP | 1065551 A2 | 1/2001 |
| EP | 2212717 B1 | 3/2015 |
| EP | 2866051 A1 | 4/2015 |
| EP | 3081956 A1 | 10/2016 |
| JP | 2009-222616 A | 10/2009 |
| JP | 2010-48662 A | 3/2010 |
| WO | 2011/036553 A1 | 3/2011 |
| WO | 2015/018836 A1 | 2/2015 |
| WO | 2016/097409 A2 | 6/2016 |
| WO | 2017/054036 A1 | 4/2017 |
| WO | 2018/090085 A1 | 5/2018 |

OTHER PUBLICATIONS

Pierrottet et al., "Linear FMCW Laser Radar for Precision Range and Vector Velocity Measurements," 2008.

Dieckmann, A., "FMCW-LIDAR with tunable twin-guide laser diode," *Electronics Letters*, 30:4, 1994.

Quack et al., "Development of an FMCW LADAR Source Chip using MEMS-Electronic-Photonic Heterogeneous Integration," GOMACTech, Charleston, South Carolina, USA, Mar. 31-Apr. 3, 2014.

Gao et al., "Complex-optical-field lidar system for range and vector velocity measurement," *Optics Express*, 20:23, pp. 25867-25875, 2012.

International Search Report of the International Searching Authority dated Feb. 27, 2018, in International Patent Application No. PCT/AU2017/051395, filed Dec. 15, 2017, 8 pages.

Written Opinion of the International Searching Authority dated Feb. 27, 2018, in International Patent Application No. PCT/AU2017/051395, filed Dec. 15, 2017, 4 pages.

International-type search for provisional patent application dated Jun. 16, 2017, in Australian Patent Application No. 2016905228, filed Dec. 16, 2016, 9 pages.

The Supplementary European Search Report dated Jul. 13, 2020 in corresponding European Patent Application No. 17880429.0 (eight pages).

Notice of Reasons of First Refusal in related Japanese Patent Application No. 2019-530217, dated Aug. 25, 2021 with English machine translation (nine pages).

* cited by examiner

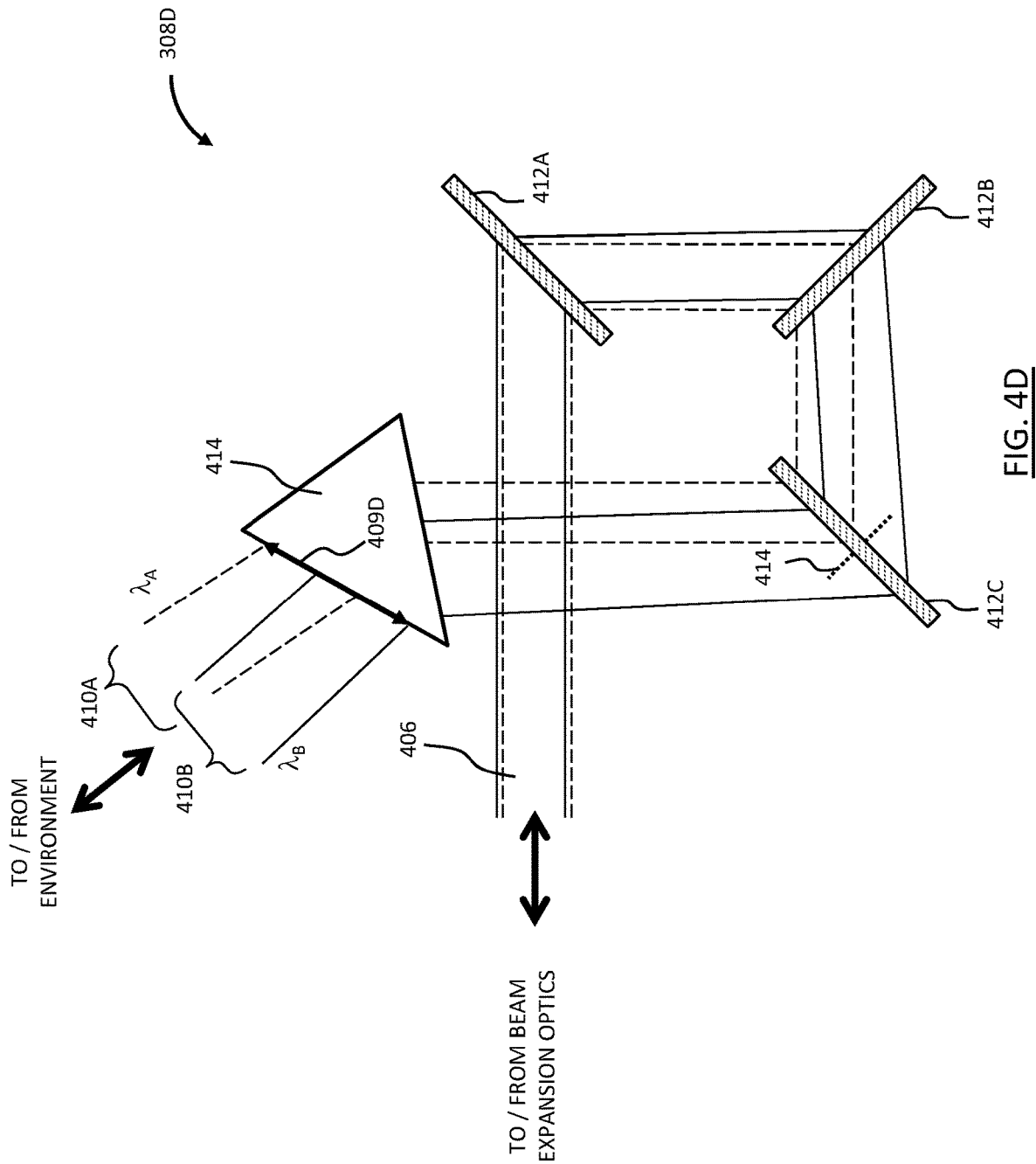

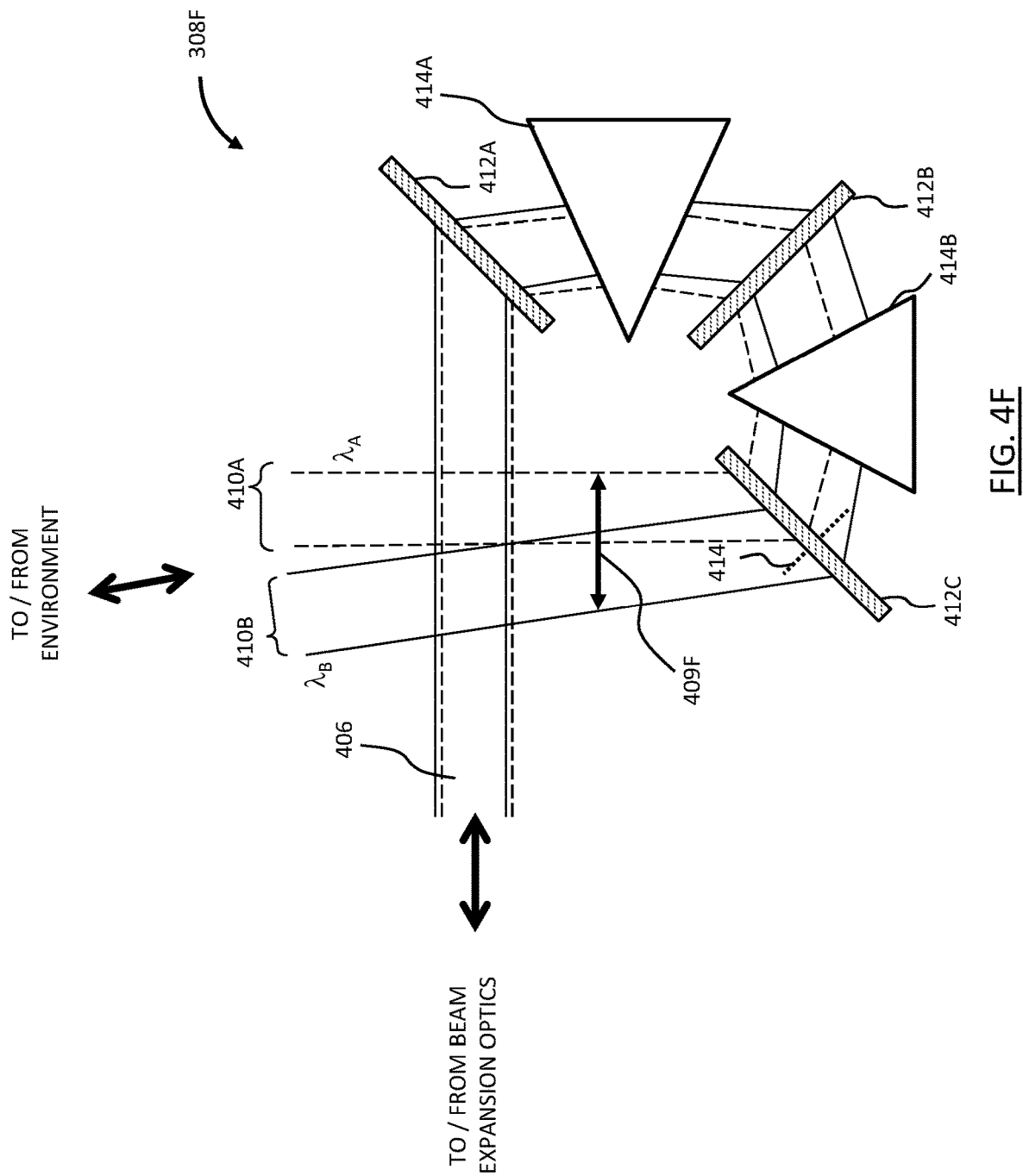

ESTIMATION OF SPATIAL PROFILE OF ENVIRONMENT

FIELD OF THE INVENTION

The present invention generally relates to a system and method for facilitating estimation of a spatial profile of an environment. More particularly, the present invention relates to facilitating estimation of a spatial profile of an environment based on directing light over at least one dimension.

BACKGROUND OF THE INVENTION

Spatial profiling refers to the mapping of an environment as viewed from a desired field of view. Each point or pixel in the field of view is associated with a distance to form a representation of the environment. Spatial profiles may be useful in identifying objects and/or obstacles in the environment, thereby facilitating automation of tasks.

One technique of spatial profiling involves sending light into an environment in a specific direction and detecting any light reflected back from that direction, for example, by a reflecting surface in the environment. The reflected light carries relevant information for determining the distance to the reflecting surface. The combination of the specific direction and the distance forms a point or pixel in the representation of the environment. The above steps may be repeated for multiple different directions to form other points or pixels of the representation, thereby facilitating estimation of the spatial profile of the environment within a desired field of view.

Reference to any prior art in the specification is not, and should not be taken as, an acknowledgment or any form of suggestion that this prior art forms part of the common general knowledge in any jurisdiction or that this prior art could reasonably be expected to be understood, regarded as relevant and/or combined with other pieces of prior art by a person skilled in the art.

SUMMARY OF THE INVENTION

According to a first aspect of the invention, there is provided a system for facilitating estimation of a spatial profile of an environment, the system including:
a light source configured to provide light at selected one or more of multiple wavelength channels, the light having at least one time-varying attribute;
a beam director including an aperture and configured to:
spatially direct outgoing light through the aperture into the environment and receive at least part of the outgoing light reflected by the environment, the outgoing light to be directed through:
a first portion of the aperture in a first direction of multiple directions into the environment along a first dimension, the first direction corresponding to the outgoing light at a first selected wavelength channel; and
a second portion of the aperture in a second direction of the multiple directions into the environment along the first dimension, the second direction corresponding to the outgoing light at a second selected wavelength channel, the second portion spatially overlapping with the first portion,
a light detector configured to detect the reflected light; and
a processing unit configured to determine at least one characteristic associated with the at least one time-varying attribute of the reflected light for estimation of the spatial profile of the environment associated with the first direction and the second direction.

The outgoing light at the first selected wavelength channel may include a substantially identical beam shape to that of the outgoing light at the second selected wavelength channel.

The beam director may be configured to receive the reflected light at the first selected wavelength channel through a third portion of the aperture, and receive the reflected light at the second selected wavelength channel through a fourth portion of the aperture, the third portion of the aperture spatially overlapping with the fourth portion of the aperture. The first, second, third and fourth portions of the aperture may be spatially overlapping with one another.

In one example, the first and second portion of the aperture may correspond to at least a beam waist size of 4 mm.

In one example, the third and fourth portions of the aperture correspond to at least a beam waist size of 4 mm.

The system may further comprises a light transport assembly configured to transport the outgoing light from the light source to the beam director and transport the reflected light from the beam director to the light detector, the light transport assembly including:
an outbound guided-optic route between the light source and the beam director for carrying the outgoing light at the first and second selected wavelength channels; and
an inbound guided-optic route between the beam director and the light detector for carrying the reflected light at the first and second selected wavelength channels.

The inbound and outbound guided-optic routes may each be selected from the group of: a fibre-optic route and an optical circuit route. The outbound guided-optic route may be associated with a smaller numerical aperture than that of the inbound guided-optic route. The outbound guided-optic route may be spatially separate from the inbound guided-optic route.

The light transport assembly may include a single-mode fibre in the outbound guided-optic route and a multi-mode fibre in the inbound guided-optic route.

The outbound guided-optic route may spatially overlap with the inbound guided-optic route.

The light transport assembly may include a double-clad fibre in the spatially overlapped outbound and inbound guided-optic routes, the double-clad fibre associating with a first numerical aperture for the outbound guided-optic route and a second numerical aperture, larger than the first numerical aperture, for the inbound guided-optic route.

The beam director may include one or more diffraction gratings. The one or more diffraction gratings may comprise three diffraction gratings arranged to turn the light in a clockwise or anti-clockwise path.

The beam director includes one or more beam compensators. At least one of the one or more beam compensators may be located in between adjacent pairs of the one or more diffraction gratings.

The beam director may be rotatable, or may include a rotatable refractive or reflective element, to direct light over a second dimension substantially orthogonal to the first dimension. The light transport assembly may include a slip ring assembly for coupling light with the rotatable beam director.

The beam director includes a spectral comb filter for porting light between a composite port and one of N interleaving ports, the composite port configured to receive or provide light at any one of every N-th consecutive wavelength channels of the multiple wavelength channels, the N interleaving ports configured to respectively provide or respectively receive corresponding light at one of N groups of wavelength channels. The N interleaving ports may each be offset by a respective amount from an optical axis to provide a corresponding angular separation over a second dimension. N may be any integer between 2 and 16 inclusive.

According to a second aspect of the invention, there is provided a system for facilitating estimation of a spatial profile of an environment, the system including:

a light source configured to provide light at selected one or more of multiple wavelength channels, the light having at least one time-varying attribute;

a beam director including one or more diffraction gratings and configured to:

spatially direct outgoing light through the one or more diffraction gratings into the environment and receive at least part of the outgoing light reflected by the environment, the outgoing light to be directed through:

the one or more diffraction gratings in a first direction of multiple directions into the environment along a first dimension, the first direction corresponding to the outgoing light at a first selected wavelength channel; and the one or more diffraction gratings in a second direction of the multiple directions into the environment along the first dimension, the second direction corresponding to the outgoing light at a second selected wavelength channel, any one or more of the one or more diffraction gratings being adjustably tiltable to direct light along a second dimension substantially orthogonal to the first dimension;

a light detector configured to detect the reflected light; and a processing unit configured to determine at least one characteristic associated with the at least one time-varying attribute of the reflected light for estimation of the spatial profile of the environment associated with the first direction and the second direction.

Further aspects of the present invention and further embodiments of the aspects described in the preceding paragraphs will become apparent from the following description, given by way of example and with reference to the accompanying drawings.

BRIEF DESCRIPTION OF THE DRAWINGS

FIG. 4D illustrates another example of an angularly dispersive element receiving and directing light at different wavelength channels.

FIG. 4F illustrates another example of an angularly dispersive element receiving and directing light at different wavelength channels.

DETAILED DESCRIPTION OF EMBODIMENTS

Figure 1A:
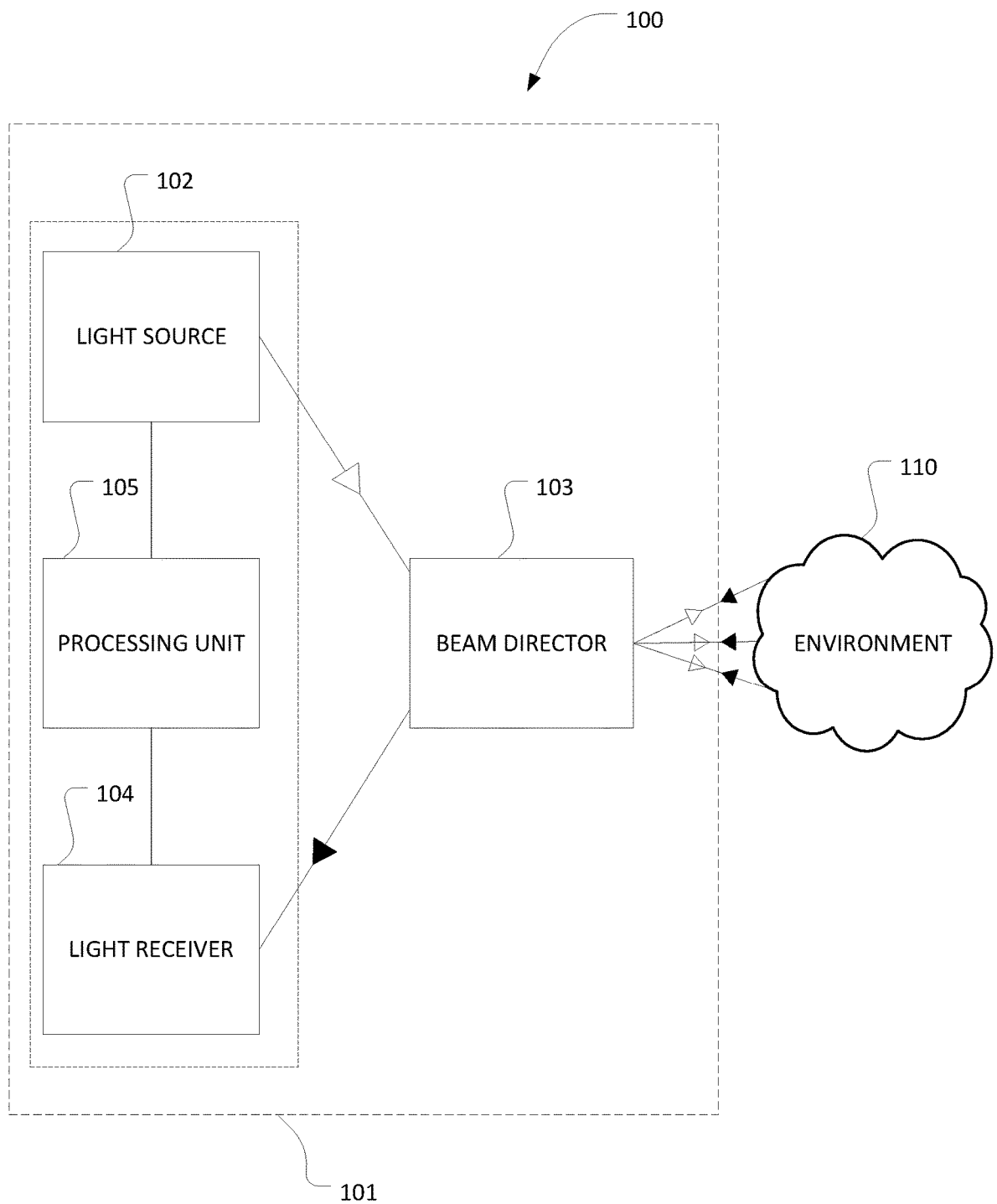
FIGS. 1A, 1B and 1C each illustrate an arrangement of a system to facilitate estimation of the spatial profile of an environment.

Disclosed herein is a system and method for facilitating estimation of a spatial profile of an environment based on a light detection and ranging (LiDAR) based technique. "Light" hereinafter includes electromagnetic radiation having optical frequencies, including far-infrared radiation, infrared radiation, visible radiation and ultraviolet radiation. In general, LiDAR involves transmitting light into the environment and subsequently detecting the light reflected by the environment. By determining the time it takes for the light to make a round trip to and from, and hence the distance of, reflecting surfaces within a field of view, an estimation of the spatial profile of the environment may be formed. In one arrangement, the present disclosure facilitates spatial profile estimation based on directing light over one dimension, such as along the vertical direction. In another arrangement, by further directing the one-dimensionally directed light in another dimension, such as along the horizontal direction, the present disclosure facilitates spatial profile estimation based on directing light in two dimensions.

The inventors recognise that, in directing light over at least one dimension, the competing requirements associated with selecting an optical beam size of the outgoing light plays a role in improving detection of the reflected light. In general, a larger initial beam size causes less beam divergence over distance. Selecting a larger initial beam size can therefore improve the received or detected power for a fixed detector area. Doing so enhances system performance, such as increasing the signal-to-noise ratio for longer range detection and more accurate spatial estimation, and/or decreasing the transmitted power requirement for improving power consumption and conservation. However, any optical system has a certain aperture, limited for example by its physical footprint, which places practical limitations on the maximum beam size. Certain solutions that direct light by angling separate light sources transmitting light through different sub-divided portions of the aperture inevitably reduce the outgoing beam size and hence reduce the received power. Other solutions that involve steering light at a particular angle by mechanically adjusting a mirror are expected to require additional mechanical stability. In view of these competing requirements, the inventors have devised a system and method for directing outgoing light in a LiDAR-based system that can substantially maximise utilisation of the aperture size regardless of the number of angles or directions over which light is directed towards.

Spatial diffraction governs the optical beam divergence. For example, for a Gaussian beam (i.e. a beam having a Gaussian intensity distribution against a radial displacement from the beam axis), the beam radius w at range z (i.e. the radial displacement at which the intensity falls to $1/e^2$ of the axial value) is given by $w(z)=w_0\sqrt{1+(z/z_R)^2}$ where $w_0$ is the beam waist and $z_R=\pi w_0^2/\lambda$ is the Rayleigh range. For another beam profile, spatial diffraction optics computation may be used to determine the beam profile at range z. Unless otherwise specified, the following disclosure is provided under the assumption that the light source provides light having a Gaussian beam profile.

The Rayleigh range $z_R$ is a useful metric to quantify the range of a collimated beam. It is the distance at which a Gaussian beam, with a given beam waist, increases its beam size by $\sqrt{2}$. The above equation for Gaussian beam is applicable to any starting point along the z axis, including negative z values. For a beam propagating in the positive z direction, the beam is converging for z<0 and diverging for z>0. The wavefront is planar at z=0 which is the beam waist and where the beam is neither converging nor diverging. The radius of curvature of the wavefront is given by $R(z)=z[1+(z_R/z)^2]$, where a negative radius of curvature represents a converging beam and a positive radius of curvature represents a diverging beam.

A given range can be determined based on an appropriate beam waist size and radius of curvature on emission. In one arrangement, a light source (e.g. the light source 102 of FIG. 1A) emits planar wavefronts. The outgoing beam diverges based on the light source 102 being located at z=0 having a beam size of w(z=0). At $z=z_R$, the beam size is $w(z=z_R)=\sqrt{2}w_0$. On reflection at an object, part of the outgoing light may also be scattered or diffused, in which case the reflected light may no longer take the original Gaussian beam profile and hence may no longer be propagating with a beam size and a radius of curvature according to Gaussian optics. In this arrangement, $z_R$ may be set as the range of the system. For example, at $\lambda=1550$ nm, $z_R$ is approximately 200 metres for $w_0=10$ mm. The corresponding range for such an example may be therefore set as 200 metres (i.e. from z=0 to $z=z_R=200$ metres).

In another arrangement, the light source 102 emits converging wavefronts, such as corresponding to those at $z=-z_R$. The outgoing beam on emission converges and diverges based on the light source 102 being located at $z=-z_R$ having a beam size of $w(z=-z_R)=\sqrt{2}w_0$. The outgoing light on propagation evolves towards a beam waist w(z=0) at z=0 and a beam size of $w(z=-z_R)=\sqrt{2}w_0$ at $z=+z_R$. In this arrangement, $2z_R$ may be set as the range of the system. Compared to the first arrangement, this arrangement improves the maximum range twice, as well as improving the spatial resolution at half the range due to the beam evolution towards a beam waist. For example, as mentioned, at $\lambda=1550$ nm, $z_R$ is approximately 200 metres for $w_0=10$ mm. The corresponding range for such an example may be therefore set as 400 metres (i.e. from $z=-z_R=-200$ metres to $z=z_R=+200$ metres).

Similarly, determining a beam size to accommodate a desired range $z_{object}$ may be based on the Rayleigh range $z_R$. For example, where the light source 102 emits planar wavefronts (e.g. corresponding to those at z=0), a desired range $z_{object}$ of 100 metres may be set to be equal to $z_R$, with the light source 102 located at z=0 metres, the reflecting surface at the desired range located at $z=+z_R=100$ metres. This value of $z_R$ corresponds to a beam waist $w_0$ of roughly 7.0 mm in radius, or 14.0 mm in diameter. The beam diameter at the desired range $z_{object}$ of 100 m is then $\sqrt{2}w_0=9.9$ mm. As another example, where the light source 102 emits converging wavefronts (e.g. corresponding to those at $z=-z_R$), a desired range $z_{object}$ of 100 metres may be set to be equal to $2z_R$, with the light source 102 located at $z=-z_R=-50$ metres, the reflecting surface at the desired range located at $z=+z_R=+50$ metres. This value of $z_R$ corresponds to a beam waist $w_0$ of roughly 5 mm in radius, or 10 mm in diameter, where this beam waist occurs at z=0 (or 50 m from the light source 102). The beam diameter at the desired range $z_{object}$ of 100 m is then $\sqrt{2}w_0=14$ mm. These examples of beam size determination aim to minimise divergence over the desired range.

The described system may be useful in monitoring relative movements or changes in the environment. For example, in the field of autonomous vehicles (land, air, water, or space), the described system can estimate from the vehicle's perspective a spatial profile of the traffic conditions, including the distance of any objects, such as an obstacle or a target ahead. As the vehicle moves, the spatial profile as viewed from the vehicle at another location may change and may be re-estimated. As another example, in the field of docking, the described system can estimate from a container ship's perspective a spatial profile of the dock, such as the closeness of the container ship to particular parts of the dock, to facilitate successful docking without collision with any parts of the dock. As yet another example, in the field of line-of-sight communication, such as free-space optical or microwave communication, the described system may be used for alignment purposes. Where the transceiver has moved or is moving, it may be continuously tracked so as to align the optical or microwave beam. As further examples, the applicable fields include, but are not limited to, industrial measurements and automation, site surveying, military, safety monitoring and surveillance, robotics and machine vision, printing, projectors, illumination, attacking and/or flooding and/or jamming other laser and IR vision systems.

FIG. 1A illustrates an arrangement of a spatial profiling system 100A according to an embodiment of the present disclosure. The system 100A includes a light source 102, a beam director 103, a light detector 104 and a processing unit 105. In the arrangement of FIG. 1A, light from the light source 102 is directed by the beam director 103 in a direction in one or two dimensions into an environment 110 having a spatial profile. If the outgoing light hits an object or a reflecting surface, at least part of the outgoing light may be reflected (represented in solid arrows), e.g. scattered, by the object or reflecting surface back to the beam director 103 and received at the light detector 104. The processing unit 105 is operatively coupled to the light source 102 for controlling its operations. The processing unit 105 is also operatively coupled to the light detector 104 for determining the distance to the reflecting surface, by determining the round-trip time for the reflected light to return to the beam director 103.

Figure 1B:
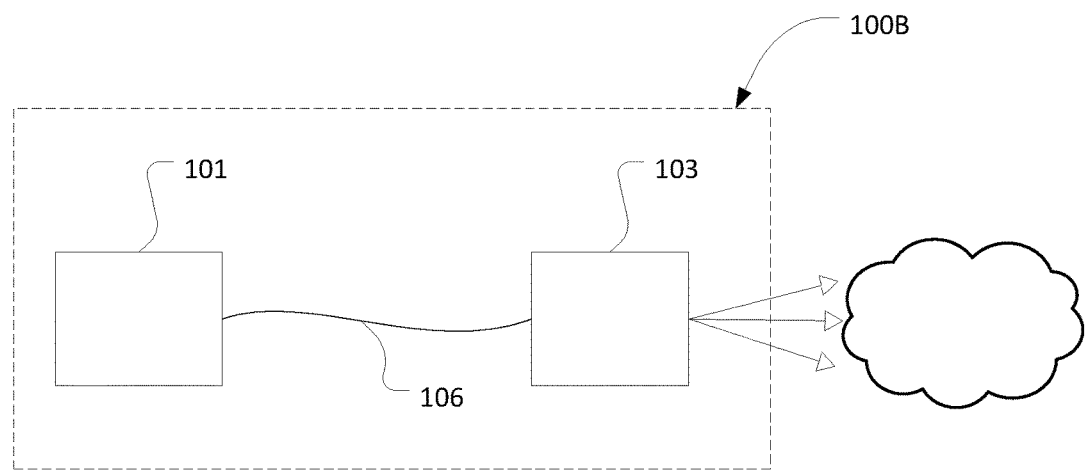
Figure 1C:
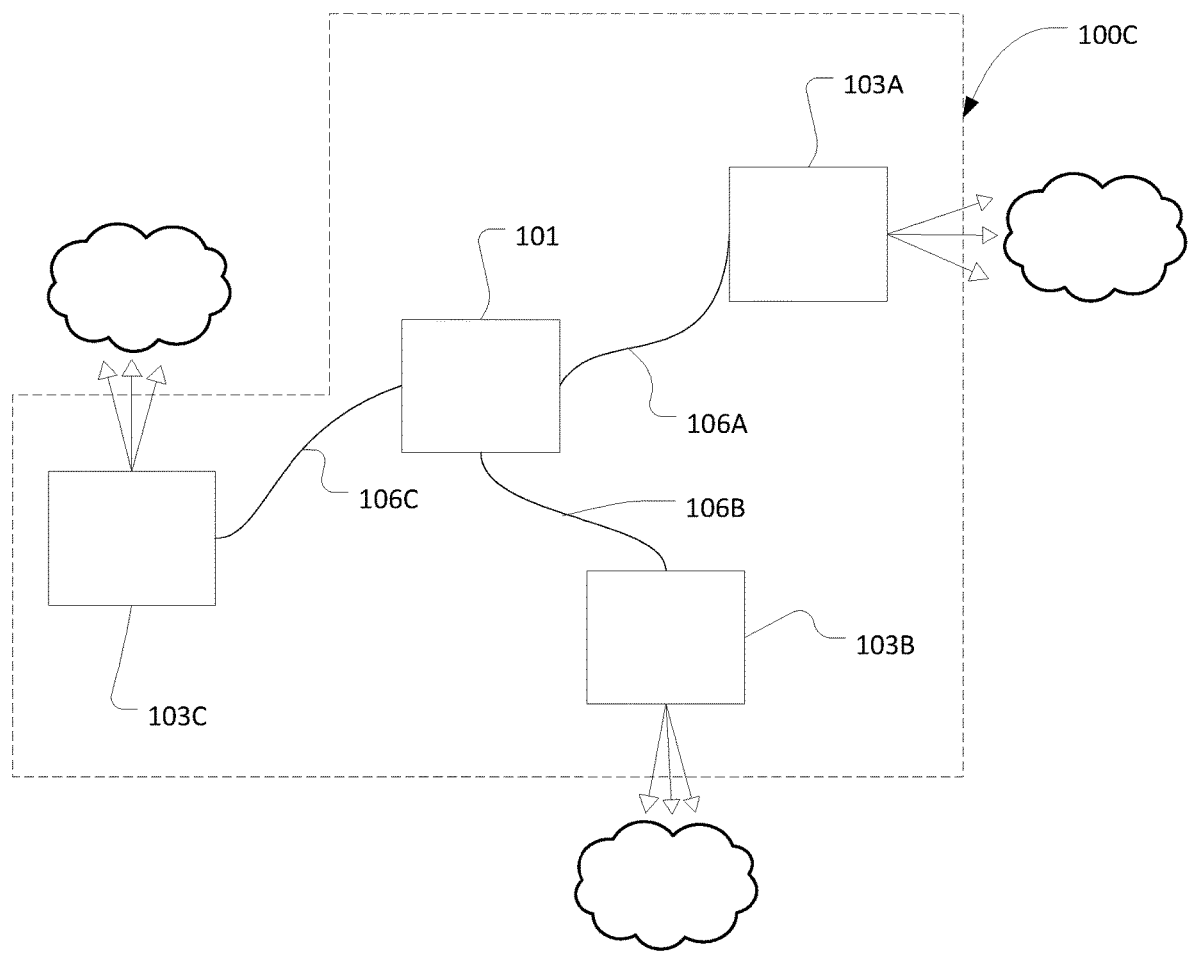

In one variant, the light source 102, the beam director 103, the light detector 104 and the processing unit 105 are substantially collocated. For instance, in an autonomous vehicle application, the collocation allows these components to be compactly packaged within the confines of the vehicle or in a single housing. In another variant, in a spatial profiling system 100B as illustrated FIG. 1B, the light source 102, the light detector 104 and the processing unit 105 are substantially collocated within a "central" unit 101, whereas the beam director 103 is remote from the central unit 101. In this variant, the central unit 101 is optically coupled to the remote beam director 103 via one or more optical fibres 106. This example allows the remote beam director 103, which may include only passive components (such as passive cross-dispersive optics), to be placed in more harsh environment, because it is less susceptible to external impairments such as heat, moisture, corrosion or physical damage. In yet another variant, as illustrated in FIG. 1C, a spatial profiling system 100C may include a single central unit 101 and multiple beam directors (such as 130A, 130B and 130C). Each of the multiple beam directors may be optically coupled to the central unit 101 via respective optical fibres (such as 106A, 106B and 106C). In the example of FIG. 1C, the multiple beam directors may be placed at different locations and/or orientated with different fields of view. Unless specified otherwise, the description hereinafter refers to the collocation variant, but a skilled person would appreciate that with minor modifications the description hereinafter is also applicable to other variants.

A light wave involves an oscillating field E which can mathematically be described as:

$$E(t) \propto \sqrt{I(t)} \cos[\varphi(t)] = \sqrt{I(t)} \cos\left[\frac{2\pi c}{\lambda_k} t + 2\pi f_d(t) t\right]$$

where $I(t)$ represents the intensity of the light, $\varphi(t)=(2\pi c/\lambda_k)t+2\pi f_d(t)t$ represents the phase of the field, $\lambda_k$ represents the centre wavelength of the k-th wavelength channel, $f_d(t)$ represents the optical frequency deviation from the centre optical frequency of the k-th wavelength channel, and $c=299792458$ m/s is the speed of light. The light source 102 is configured to provide the light having at least one time-varying attribute, such as a time-varying intensity profile $I(t)$ and/or a time-varying frequency deviation $f_d(t)$. The at least one time-varying attribute imparts time-stamped information on the outgoing light which, on return and detection, allows the processing unit 105 to determine the round-trip time and hence distance.

Figure 2A:
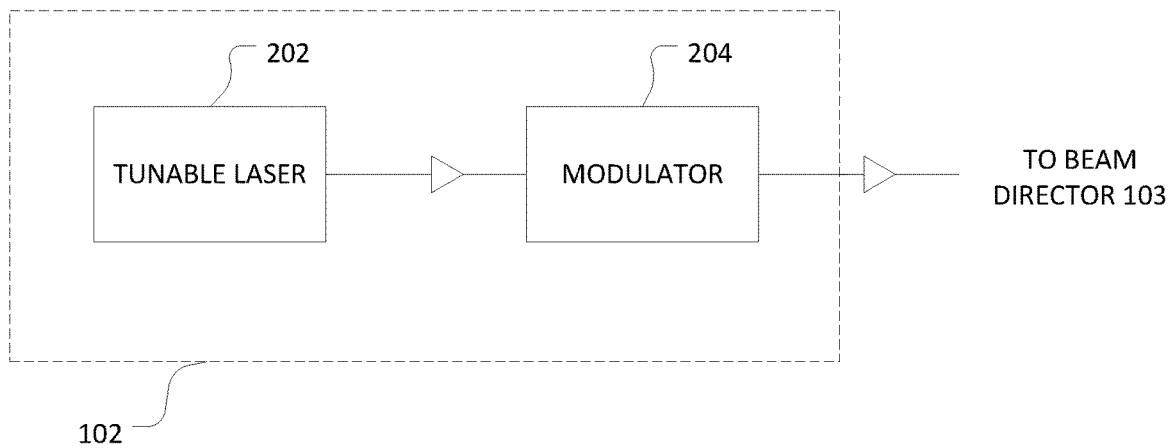
FIGS. 2A and 2B each illustrate an arrangement of a light source providing outgoing light having a time-varying intensity profile.

In one arrangement, the light source 102 is configured to provide the outgoing light having a time-varying intensity profile $I(t)$ at a selected one of multiple wavelength channels (each represented by its respective centre wavelength $\lambda_1, \lambda_2, \ldots \lambda_N$). FIG. 2A illustrates an example of one such arrangement of the light source 102. In this example, the light source 102 may include a wavelength-tunable light source, such as a wavelength-tunable laser diode, providing light of a tunable wavelength based on one or more electrical currents (e.g. the injection current into the into one of more wavelength tuning elements in the laser cavity) applied to the laser diode. In another example, the light source 102 may include a broadband light source and a tunable spectral filter to provide substantially continuous-wave (CW) light intensity at the selected wavelength.

In the example of FIG. 2A, the light source 102 may include a modulator 204 for imparting a time-varying intensity profile on the outgoing light. In one example, the modulator 204 is a semiconductor optical amplifier (SOA) or a Mach Zehnder modulator integrated on the laser diode. The electrical current applied to the SOA may be varied over time to vary the amplification of the CW light produced by the laser over time, which in turn provide outgoing light with a time-varying intensity profile. In another example, the modulator 204 is an external modulator (such as a Mach Zehnder modulator or an external SOA modulator) to the laser diode. In yet another example, instead of including an integrated or external modulator, the light source 102 includes a laser having a gain medium into which an excitation electrical current is controllably injected for imparting a time-varying intensity profile on the outgoing light.

Figure 2B:
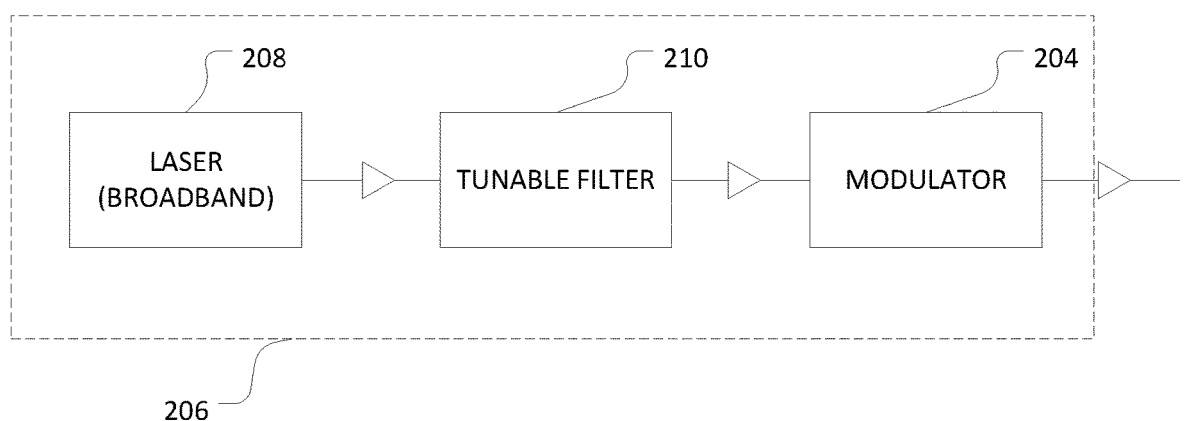

In another arrangement, as illustrated in FIG. 2B, instead of having a wavelength-tunable laser 202, the light source 206 includes a broadband laser 208 followed by a wavelength-tunable filter 210. In yet another arrangement (not illustrated), the light source 206 includes multiple laser diodes, each wavelength-tunable over a respective range and whose respective outputs are combined to form a single output. The respective outputs may be combined using a wavelength combiner, such as an optical splitter or an AWG.

Figure 2C:
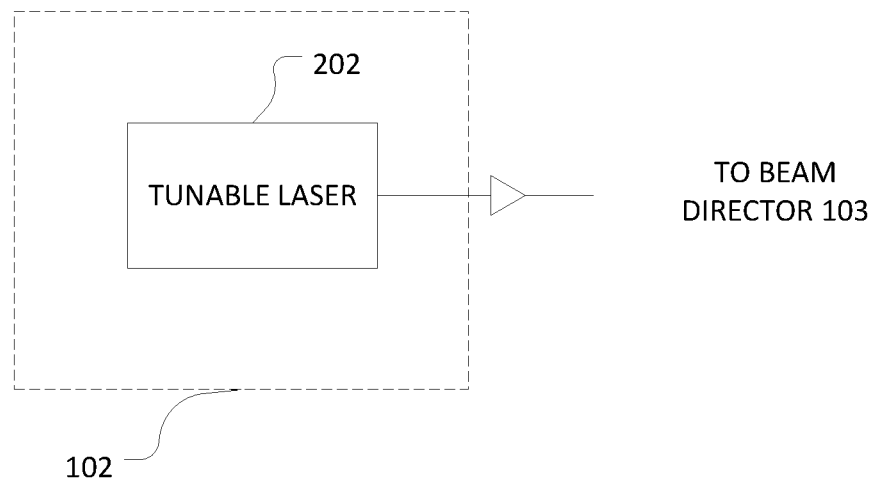
FIGS. 2C and 2D each illustrate an arrangement of a light source providing outgoing light having a time-varying frequency deviation.
Figure 2D:
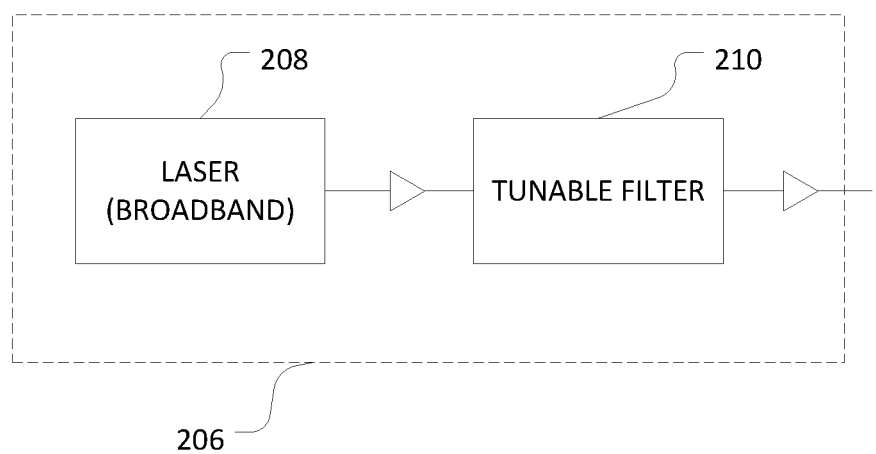

In another arrangement, the light source 102 is configured to provide the outgoing light having a time-varying frequency deviation $f_d(t)$ at a selected one of multiple wavelength channels ($\lambda_1, \lambda_2, \ldots \lambda_N$). FIG. 2C illustrates an example of one such arrangement of the light source 102. The instantaneous optical frequency f and the instantaneous wavelength A of a light field represent an equivalent physical attribute of a wave—the oscillation rate of the light field—and are related by the wave equation $c=f\lambda$. Since the speed of light c is a constant, varying either f or $\lambda$ necessarily varies the other quantity accordingly. Similarly, as in an example illustrated FIG. 2D, varying either $\lambda_k$ or $f_d$ may be described as varying the other quantity accordingly. In particular, $f_d(t)$ and $\lambda_k$ are related as follows:

$$\lambda = c/(c/\lambda_k + f_d) \text{ and}$$

$$f = c/\lambda_k + f_d$$

In practice, changes in $f_d(t)$ and $\lambda_k$ of the light source 102 may be effected by a single control, e.g. tuning the wavelength of the light source 102 by, for example, an injection current into a laser diode. However, for clarity, the description hereinafter associates frequency deviation $f_d(t)$ with deviation in the optical frequency within a single wavelength channel from its centre optical frequency, whereas changes in $\lambda_k$ are associated with causing the light source 102 to jump from one wavelength channel to another. For example, a smaller and substantially continuous wavelength change of the light source 102 is described to cause a time-varying frequency deviation $f_d(t)$, whereas a larger and stepped wavelength change of the light source 102 is described to cause the light source 102 to jump from wavelength channel $\lambda_k$ to $\lambda_{k+1}$.

In another arrangement, the light source 102 may be configured to provide outgoing light with both time-varying intensity profile $I(t)$ and time-varying frequency deviation $f_d(t)$. The examples shown in FIGS. 2A and 2B are both suitable for use in such an arrangement of the light source 102. The description above on (a) time-varying intensity profile I(t) and (b) time-varying frequency deviation $f_d(t)$ applies to such an arrangement of the light source 102.

The light source 102 is configured to provide light at selected one or more of multiple wavelength channels. In one arrangement, the light source 102 provides a single selected wavelength channel at a time, such as a wavelength-tunable laser. In this arrangement, the described system 100 is capable of steering light in a particular direction based on one selected wavelength channel at a time. In another arrangement, the light source 102 provides a single or multiple selected wavelength channels, such as a broadband source followed by a tunable filter, the tunable pass band of which includes the single or multiple selected wavelength channels. Where one selected wavelength channel is used at a time, the light detector 104 may include an avalanche photodiode (APD) that detects any wavelength within the range of the multiple wavelength channels. Where multiple selected wavelength channels are used at a time, the light detector 104 may include a wavelength-sensitive detector system, such as using multiple APDs each dedicated to a specific wavelength channels, or using a single APD for multiple wavelength channels, each channel being distinguishably detectable based on their time-varying attribute (e.g. based on a different sinusoidal modulation such as a modulation frequency of 21 MHz, 22 MHz and 23 MHz . . . corresponding, respectively, to 1550.01, 1550.02 and 1550.03 nm . . . channels). The description hereinafter relates to light direction by providing a single selected wavelength channel at a time, but a skilled person would appreciate that, with minor modifications, the description is also applicable to light direction by providing multiple selected wavelength channels at a time.

The operation of the light source 102, such as both the wavelength-tunable laser 202 (e.g. its wavelength) and the modulator 204 (e.g. the modulating waveform), may be controlled by the processing unit 105.

Figure 3:
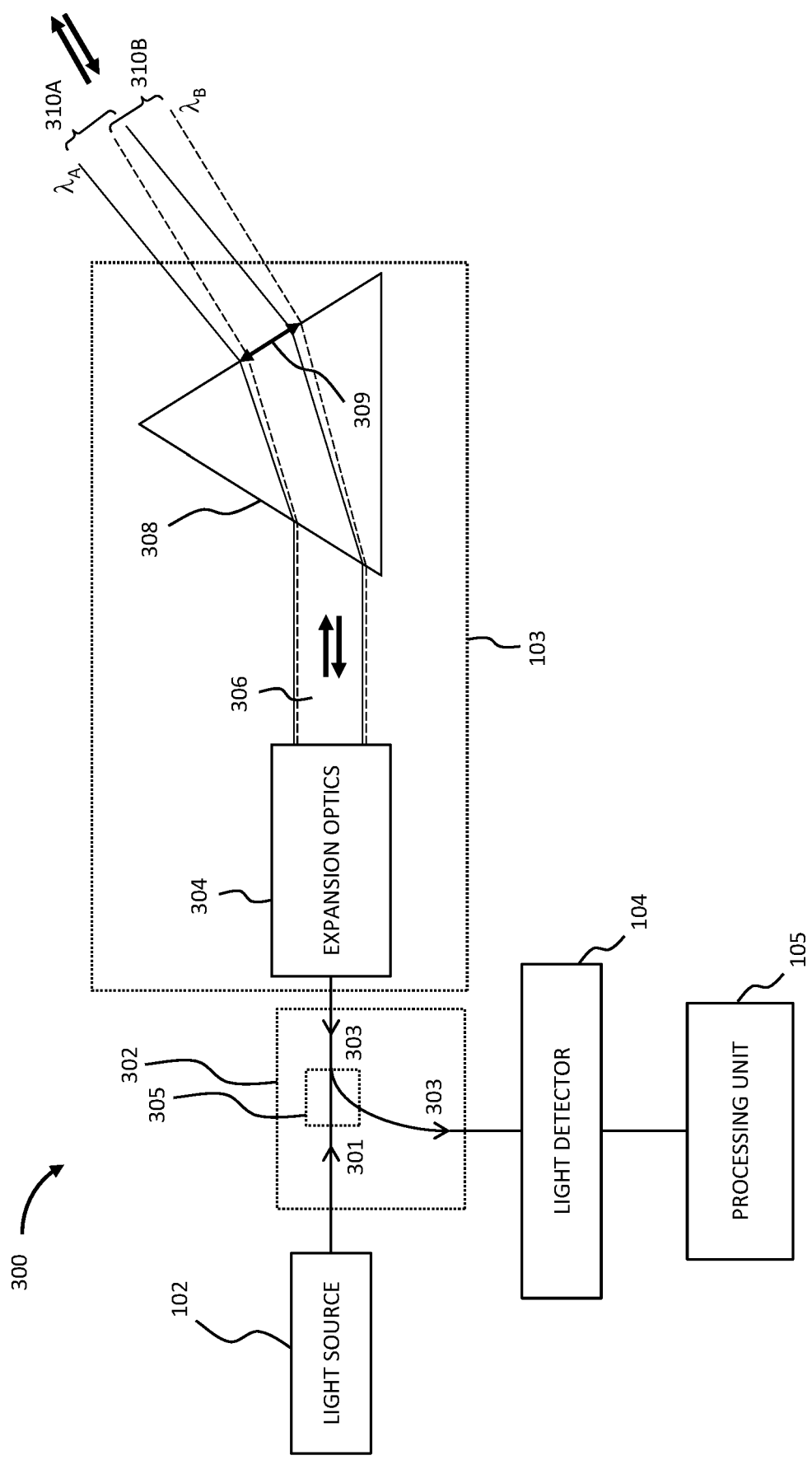
FIG. 3 illustrates another arrangement of a system to facilitate estimation of the spatial profile of an environment.

FIG. 3 illustrates an example 300 of the disclosed system in FIG. 1A. In this example, the system 300 includes a light transport assembly 302 configured to transport the outgoing light 301 from the light source 102 to the beam director 103 and transport the reflected light 303 from the beam director 103 to the light detector 104.

The light transport assembly 302 includes optical waveguides such as optical fibres or optical circuits (e.g. photonic integrated circuits) in the form of 2D or 3D waveguides. As described further below, the outgoing light from the light source 102 is provided to the beam director 103 for directing into the environment. In some embodiments, any reflected light collected by the beam director 103 may additionally be directed to the light detector 104. In one arrangement, for light mixing detection, light from the light source 102 is also provided to the light detector 104 for optical processing purposes via a direct light path (not shown) from the light source 102 to the light detector 104. For example, the light from the light source 102 may first enter a sampler (e.g. a 90/10 guided-optic coupler), where a majority portion (e.g. 90%) of the light is provided to the beam director 103 and the remaining sample portion (e.g. 10%) of the light is provided to the light detector 104 via the direct path. In another example, the light from the light source 102 may first enter an input port of an optical switch and exit from one of two output ports, where one output port directs the light to the beam director 103 and the other output port re-directs the light to the light detector 104 at a time determined by the processing unit 105.

The light transport assembly 302 includes a three-port element 305 for coupling outgoing light received from a first port to a second port and coupling received from the second port to a third port. The three-port element may include an optical circulator or a 2×2 coupler (where a fourth port is not used).

In one arrangement, the light transport assembly 302 includes an outbound guided-optic route between the light source 102 and the beam director 103 for carrying the outgoing light 301 at the first and second selected wavelength channels and an inbound guided-optic route 303 between the beam director 102 and the light detector 104 for carrying the reflected light 303 at the first and second selected wavelength channels (either at the same time or at different times). The guided-optic routes may each be one of a fibre-optic route and an optical circuit route.

In this arrangement, the beam director 103 includes beam expansion optics 304, such as a pigtailed collimator, to expand the outgoing light 301 in a wave-guided form into an expanded beam 306 in free-space form having a beam shape including a beam size. The solid lines and the dashed lines represent expanded beams in different selected wavelength channels, and are illustrated to be slightly offset for illustrative purposes. In practice they may or may not overlap substantially or entirely in space. Subsequent figures depicting solid and dashed lines are represented in a similar manner. The beam director 103 further includes an angularly dispersive element 308 providing angular dispersion of light based on the wavelength of the light. The angularly dispersive element 308 is configured to direct the expanded beam 306 into at least a first direction 310A and a second direction 310B along the first dimension, depending on the wavelength. While the angularly dispersive element 308 is schematically illustrated in the form of a triangular element for simplicity, its actual form may differ and may include multiple elements. Examples of the angularly dispersive element 308 include one or more diffraction gratings, some examples of which are illustrated and further described in relation to FIGS. 4A to 4J. The first direction 310A corresponds to the outgoing light at a first selected wavelength channel $\lambda_A$. The second direction 310B corresponds to the outgoing light at a first selected wavelength channel $\lambda_B$.

In this arrangement, the beam director 103 includes an aperture 309, illustrated in this arrangement as a double-headed arrow on an exit surface of the angularly dispersive element 308. Although the aperture 309 is illustrated and described in this arrangement to be on the exit surface of the angularly dispersive element 308, the aperture of the beam director 103 may be at any point along the optical path and on any interface or plane (e.g. the entry surface of the angularly dispersive element 308) through which the beam director 103 directs light into one or more of multiple directions. The beam director 103 is configured to spatially direct outgoing light 301 through the aperture 309 into the environment and receive reflected light 301 being at least part of the outgoing light 301 reflected by the environment. The outgoing light 103 directed at the two directions 310A and 310B, each associated with a respective wavelength channel, overlaps spatially within the aperture 309. In particular, the outgoing light 301 at $\lambda_A$ is directed through a first portion (marked by solid lines) of the aperture 309 in the first direction 310A, whereas the outgoing light 301 $\lambda_B$ is directed through a second portion (marked by dashed lines) of the aperture 309 in the second direction 310B. The spatial overlap between the beams respectively directed at directions 310A and 310B may be substantial to enable the expanded beam 306 to substantially maximise utilisation of the size of the aperture 309. This enablement may be contrasted with a configuration where two separate light sources are angled to direct their respective light beams into different directions, so that each directed light beam utilises around half or less of the aperture size. The contrast is even greater in a configuration where a larger number of separate light sources (e.g. 10) are angled to direct their respective light beams into (e.g. 10) different directions, so that each directed light beam only utilises a fraction (e.g. 1/10) of the aperture size. In comparison, by substantially maximising utilisation of the aperture size of the beam director for differently directed light beams in accordance with the present disclosure, beam divergence is desirably minimised.

In some arrangements, a similar overlap or a similar substantial overlap exists for the reflected light 303 received from these or different directions. That is, the reflected light 303 at $\lambda_A$ is received through a third portion of the aperture 309 from a third direction associated with the first direction 310A, whereas the reflected light 303 at $\lambda_B$ is received through a fourth portion of the aperture 309, spatially overlapping with the third portion, from a fourth direction associated with the second direction 310B. In one example (such as that illustrated in FIG. 5), the outgoing light and the reflected light do not overlap or do not substantially overlap in space at the aperture 309. In an alternative example (such as that illustrated in FIG. 6), the outgoing light and the reflected light also overlap or substantially overlap in space at the aperture 309, such that the first portion, the second portion, the third portion and the fourth portions of the aperture 309 overlap or substantially overlap in space.

In one arrangement, the spatial overlap between the beams respectively directed at directions 310A and 310B is anywhere between 90 and 100% in area. In another arrangement, the spatial overlap is anywhere between 80 and 90% in area. In yet another arrangement, the spatial overlap is anywhere between 70 and 80% in area. In still yet another arrangement, the spatial overlap is anywhere between 60 and 70% in area. In still a further arrangement, the spatial overlap is anywhere between 50 and 60% in area. A skilled person would appreciate the spatial overlap may also be between 0 and 50%. The level of spatial overlap may tend to be higher for neighbouring wavelength channels or beams with a smaller angular difference in direction, and lower for far-apart wavelength channels or beams with a larger angular difference in direction.

The spatial overlap may be quantified based on one of a number of measures. In one arrangement, the quantification is based on a width measure of the overlapped beams at a certain fraction of maximum optical intensity. For example, the width measure may be the full-width at half maximum (FWHM) intensity or the full-width at $1/e^2$ maximum intensity. Alternatively, the quantification is based on a power measure of the overlapped beams. For example, the power measure may be the fraction of combined optical power contained within the overlapped regions of the beams. The selection of a particular measure to quantify the spatial overlap depends on the beam profile. For example, overlap of Gaussian beams, which have a single intensity peak, may be quantified more appropriately using the FWHM measure. In another example, overlap of higher order beams, which have multiple intensity peaks, may be quantified more appropriately using the fractional optical power measure.

In one arrangement, the directions 310A and 310B may be associated with consecutive wavelength channels of the light source 102 (i.e. the smallest wavelength changes of the disclosed system is configured to make as it directs outgoing light 301 by stepping through wavelength channels). In another arrangement, such as an arrangement involving the use of an optical interleaver described below, the directions 310A and 310B may be associated with non-consecutive wavelength channels of the light source 102.

In some arrangements, the outgoing light 301 is adjusted to have a predetermined beam profile. The divergence of a propagating beam having the predetermined beam profile can be computed, and hence known, using spatial diffraction optics. For example, for a Gaussian beam (i.e. a beam having a Gaussian intensity distribution against a radial displacement from the beam axis), the beam radius w at range z (i.e. the radial displacement at which the intensity falls to $1/e^2$ of the axial value) is given by $w(z)=w_0\sqrt{1+(z/z_R)^2}$ where $w_0$ is the beam waist and $z_R=\pi w_0^2/\lambda$ is the Rayleigh range. For another beam profile, spatial diffraction optics computation may be used to determine the beam profile at range z. Similarly computation for reverse propagation may be used to determine the outgoing beam profile for a given desired beam profile, or a given group or range of desired beam profiles, at the light detector 104. In some arrangement, the outgoing light 301 at the first selected wavelength channel $\lambda_A$ is adjusted to have substantially identical beam shape as that of the outgoing light 301 at the second selected wavelength channel $\lambda_B$. The adjustment may be achieved by a beam shaper optimised for use with multiple wavelengths within the range of the multiple wavelength channels. For example, the outgoing beams at various wavelength channels may be adjusted to have at least a beam waist size of 4 mm. In another example, the outgoing beams at various wavelength channels may be adjusted to have at least a beam waist size of 10 mm.

Figure 4A:
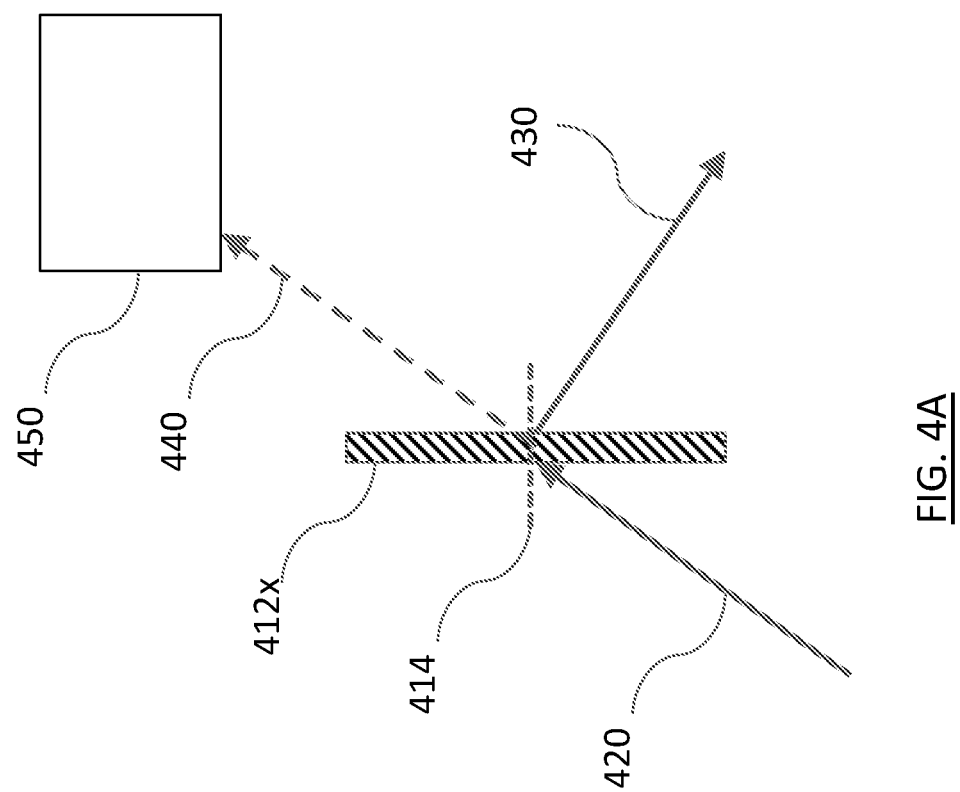
FIG. 4A illustrates a configuration for estimating a tiltable angle of a tiltable diffraction grating in any of FIGS. 4C, 4D, 4E, 4F and 4G.
Figure 4B:
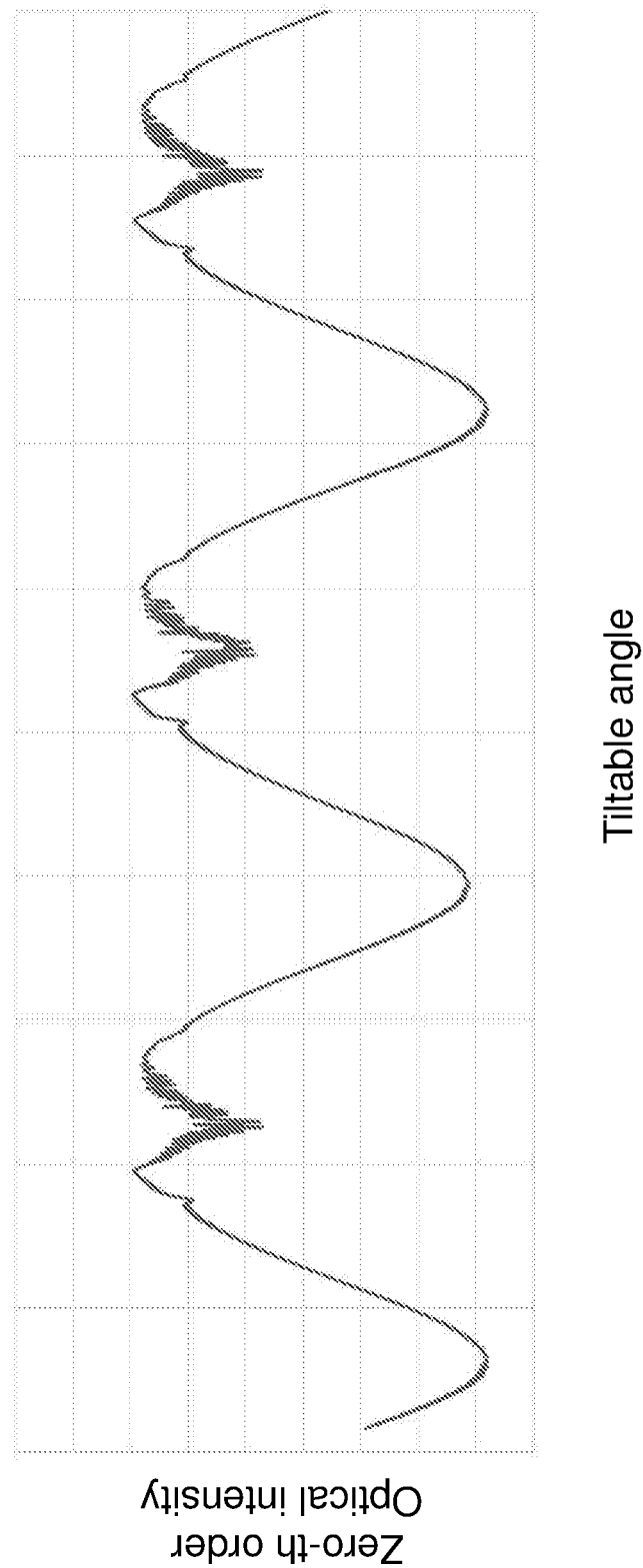
FIG. 4B illustrates an example of the relationship between zero-th order light intensity and the tiltable angle.
Figure 4C:
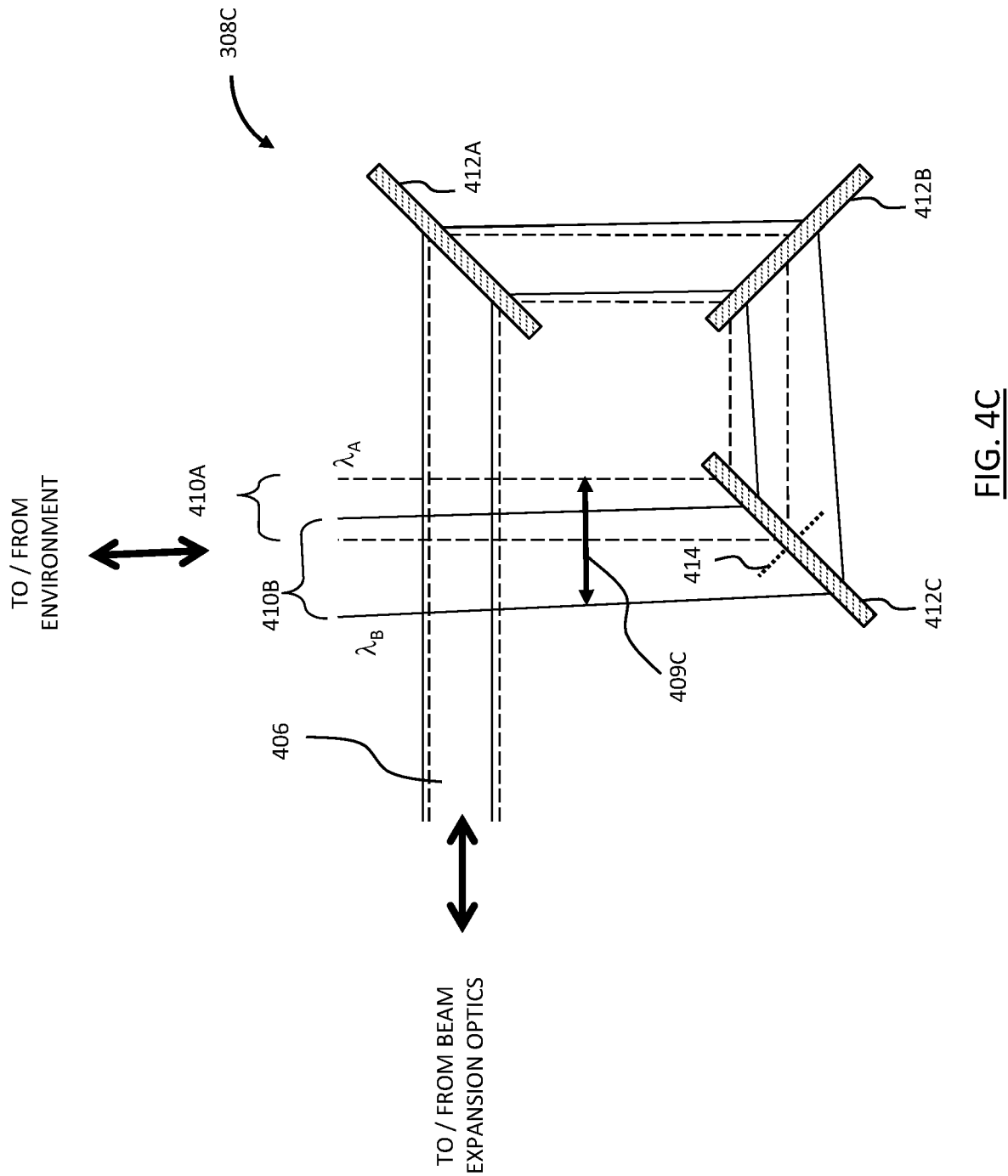
FIG. 4C illustrates another example of an angularly dispersive element receiving and directing light at different wavelength channels.

FIG. 4C illustrates an example of an angularly dispersive element 308C including one or more multiple diffraction gratings 412. While this example illustrates an arrangement with three diffraction gratings, a skilled person would appreciate that more or fewer diffraction gratings may be used. Each additional diffraction grating may provide additional diffraction, hence greater angular separation of the differently directed beams. The use of separate diffraction gratings may also allow a greater number of degrees of freedom in designing the angularly dispersive element 308C (e.g. by relaxing anti-reflection coating requirements by selecting angles towards normal incidence rather than grazing incidence). However, each additional diffraction grating may also increase attenuation (e.g. through a finite diffraction efficiency of the gratings). Each diffraction grating is configured to produce at least one diffraction order (e.g. the N=1 order) that is formed by outgoing beams directed to slightly different angles (e.g. 410A and 410B) depending on the wavelength. The outgoing light directed at the two directions 410A and 410B, each associated with a respective wavelength channel, overlaps spatially within an aperture 409C after passing the grating 412C. Similar to the angularly dispersive element 308 illustrated in FIG. 3, the diffraction gratings 412 are configured to direct the expanded beam 406 into at least a first direction 410A and a second direction 410B along the first dimension, depending on the wavelength. The first direction 410A corresponds to the outgoing light at a first selected wavelength channel $\lambda_A$. The second direction 410B corresponds to the outgoing light at a first selected wavelength channel $\lambda_B$. FIG. 4C illustrates each diffraction grating producing one diffraction order. Each grating may produce or suppress one or more other diffraction orders (e.g. the N=0 order and/or the N=−1 order). As illustrated there is a substantial overlap between differently directed beams at the aperture of each grating. In this arrangement, grating 412A receives the expanded beam 406, and directs the beam towards grating 412B, which in turn directs the beam towards grating 412C. At each diffraction grating, the beam is incrementally angularly dispersed. The use of multiple diffraction gratings increases the angular separation compared to an arrangement with, e.g. a single diffraction grating. Further, the multiple diffraction gratings are arranged to turn the light beam in the unidirectional beam path (e.g. clockwise as illustrated in FIG. 4C through gratings 412A, 412B and then 412C or anti-clockwise). The unidirectional beam path facilitates folding of the optical path and reducing the size of the angularly dispersive element 308 and hence the overall system footprint.

FIGS. 4D, 4E, 4F and 4G illustrate other examples of an angularly dispersive element (308D, 308E, 308F and 308G). Each of the angularly dispersive elements in these examples includes one or more multiple diffraction gratings 412 and one or more beam compensators 414. The angularly dispersive element 308D includes three diffraction gratings 412A, 412B and 412C and one beam compensator 414. The angularly dispersive element 308E also includes three diffraction gratings 412A, 412B and 412C and one beam compensator 414. The angularly dispersive element 308F includes three diffraction gratings 412A, 412B and 412C and two beam compensators 414A and 414B. The angularly dispersive element 308G includes two diffraction gratings 412A and 412B and two beam compensators 414A and 414B.

The diffraction grating(s) 412 are physically separated from the beam compensator(s) 414. The physical separation allows easier thermal expansion management, for example by relaxing different material or coating requirements, which may otherwise become more stringent where the diffraction grating(s) 412 are in intimate contact with the beam compensator(s) 414. In some arrangements, the beam compensator(s) 414 may each be in a form of a prism. The beam compensator(s) 414 are configured to correct for wavelength dependency on the beam characteristics, such as beam profile and/or beam size. In some arrangement, the beam compensator(s) 414 also provide additional dispersion. The outgoing light directed at the two directions 410A and 410B, each associated with a respective wavelength channel, overlaps spatially within a respective aperture 409D (at the exit face of the beam compensator 414), 409E (after passing the grating 412C), 409F (after passing the grating 412C) or 409G (after passing the grating 412C).

Figure 4E:
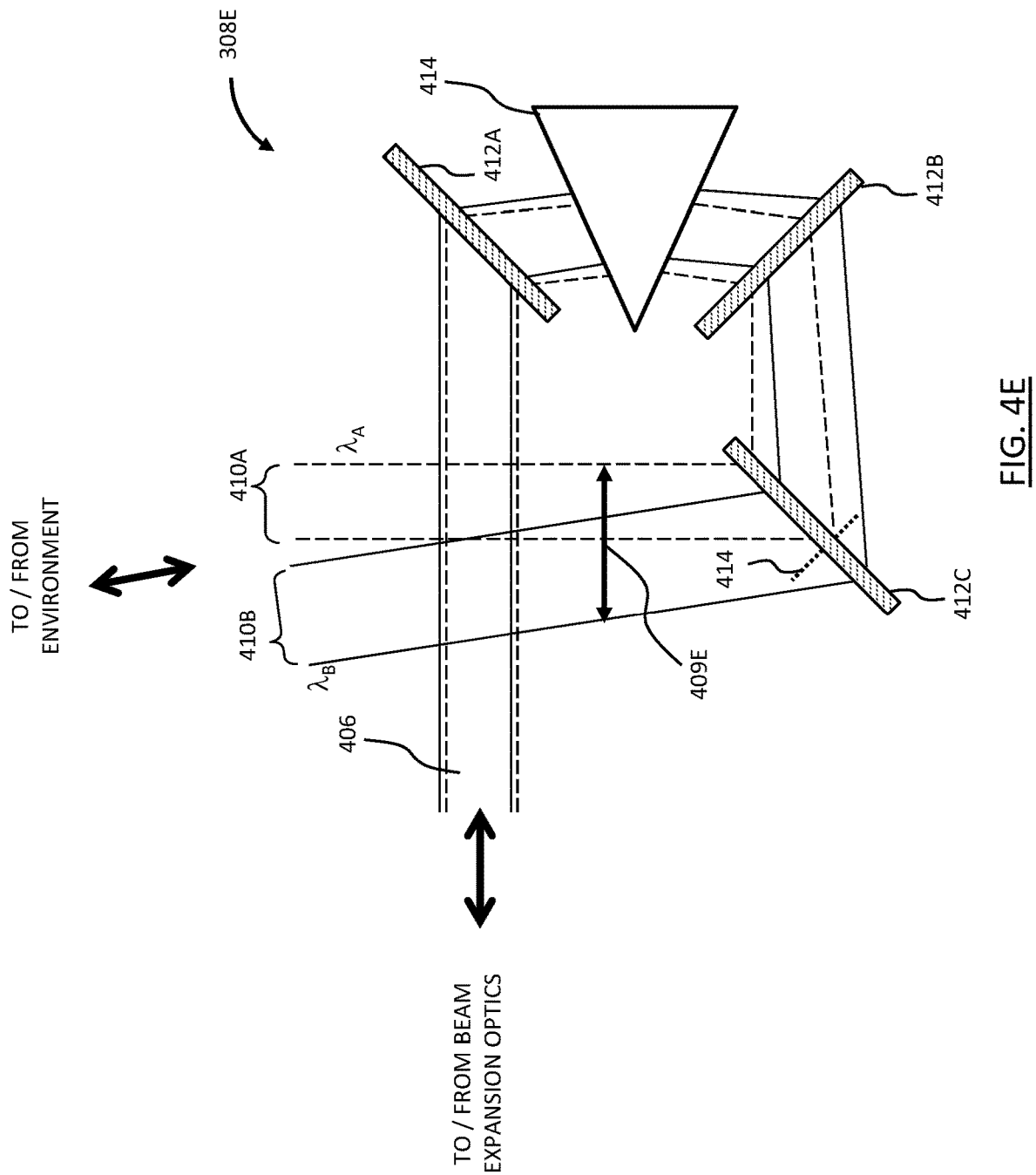
FIG. 4E illustrates another example of an angularly dispersive element receiving and directing light at different wavelength channels.
Figure 4G:
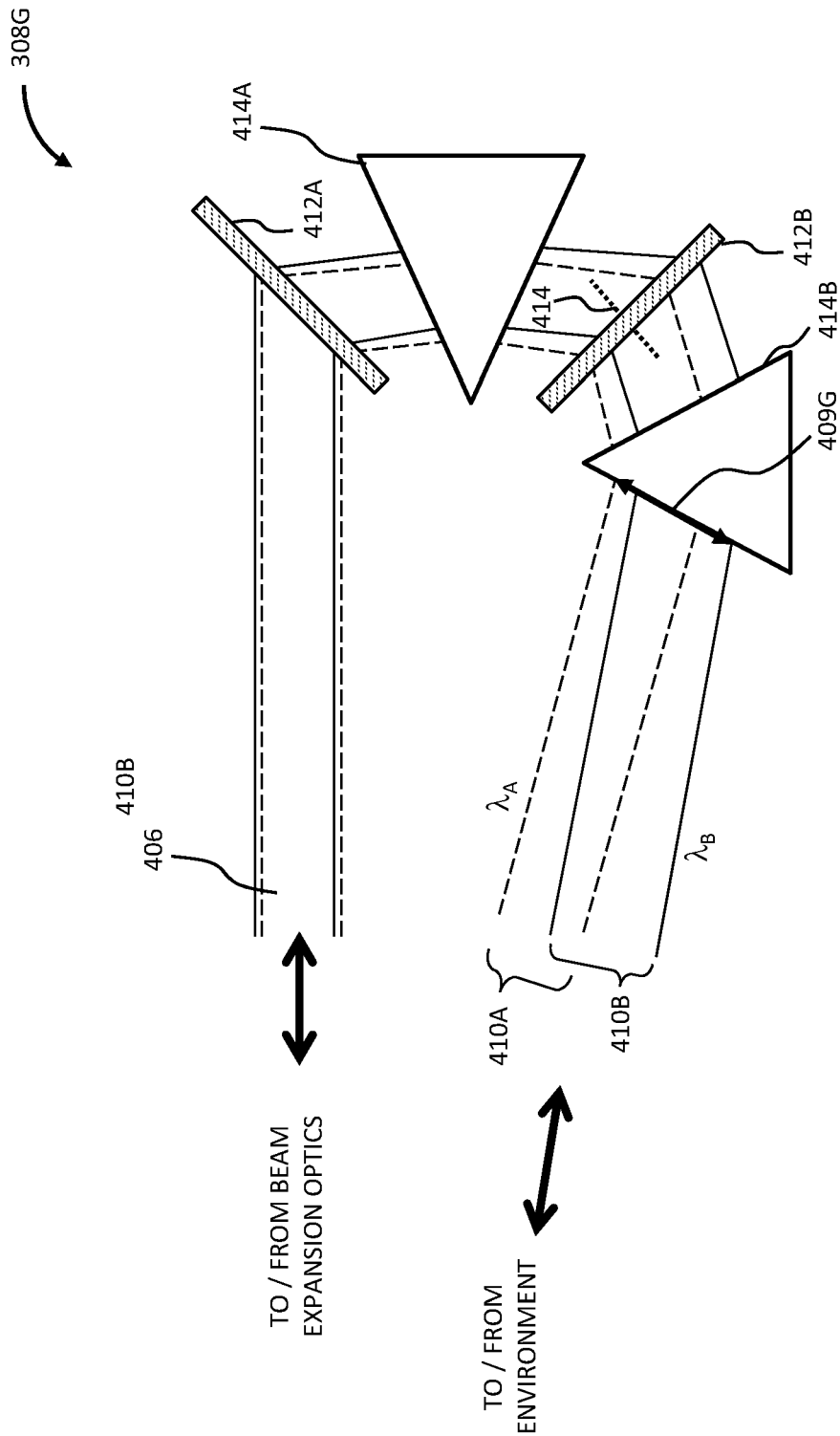
FIG. 4G illustrates another example of an angularly dispersive element receiving and directing light at different wavelength channels.

In FIG. 4D, the beam compensator 414 is not located between adjacent gratings. In contrast, in FIGS. 4E, 4F and 4G, beam compensator 414 or beam compensators 414A and 414B are located between one or more pair of adjacent gratings. For example, for a single-prism arrangement, the prism may be between gratings 412A and 412B (as illustrated in FIG. 4E). For a two-prism arrangement (as illustrated in FIG. 4F), one prism may be between gratings 412A and 412B and another may be between 412B and 412C. Compared to the arrangement in FIG. 4D, the arrangement in FIGS. 4E-4G facilitates space-saving. The use of multiple gratings and/or multiple beam compensators relaxes the optical requirements of the components. For example, by using two (rather than one) diffraction gratings or beam compensators, the required angular dispersion per diffraction grating or beam compensator may be reduced. The use of more diffraction gratings and/or beam compensators may also allow a greater number of degrees of freedom in designing the angularly dispersive element 408 (e.g. by relaxing anti-reflection coating requirements by selecting angles towards normal incidence rather than grazing incidence).

The angularly dispersive element (e.g. 308 and 408) is configured to receive and direct both outgoing light 301 and reflected light 303. Although FIGS. 3 and 4 illustrate that the angularly dispersive element is bidirectional, the outgoing and reflected light paths do not necessarily overlap. In other words, in some arrangements, the outgoing and reflected light substantially overlap at the aperture (309 and 409), while in other arrangements the outgoing and reflected light do not overlap at the aperture (309 and 409). FIG. 5 illustrates an example of a partial system 500 for facilitating estimation of a spatial profile of an environment. The partial system 500 includes the angularly dispersive element 308 illustrated in FIG. 3. As described above, while the angularly dispersive element 308 is schematically illustrated in the form of a triangular element for simplicity, its actual form may differ and may include multiple elements, such as those angularly dispersive elements illustrated in FIGS. 4C to 4G. In this example, the light transport assembly 302 includes an outbound fibre-optic route (e.g. a single-mode fibre 302A) and an inbound fibre-optic route (e.g. a multi-mode fibre 302B). Light transported in the outbound fibre-optic route from the light source (not shown) is expanded by expansion optics 304A (e.g. a pigtailed collimator) and received by the angularly dispersive element 308. The angularly dispersive element 408 then directs the expanded light into outgoing light in a direction based on its wavelength. For simplicity, light paths within the angularly dispersive element 308 are not shown. Further, only light paths at one selected wavelength channel (e.g. $\lambda_A$) is shown. Reflected light 303, schematically illustrated as having diverged, is received by the angularly dispersive element 308 and directed back to the inbound fibre-optic route via collimating optics 304B (e.g. a pigtailed collimator) and transported to the light detector (not shown). Taking into account beam divergence, the numerical aperture of the inbound fibre-optic route may be larger than that of the outbound fibre-optic route for improving light collection. Although not shown in FIG. 5, a spatial overlap exists at an aperture (not shown) of the angularly dispersive element 409 between outgoing beams 301 at different wavelength channels directed into different directions over the first dimension. Further, a similar spatial overlap may exist between the reflected beams 303 at different wavelength channels directed into different directions over the first dimension.

Figure 6:
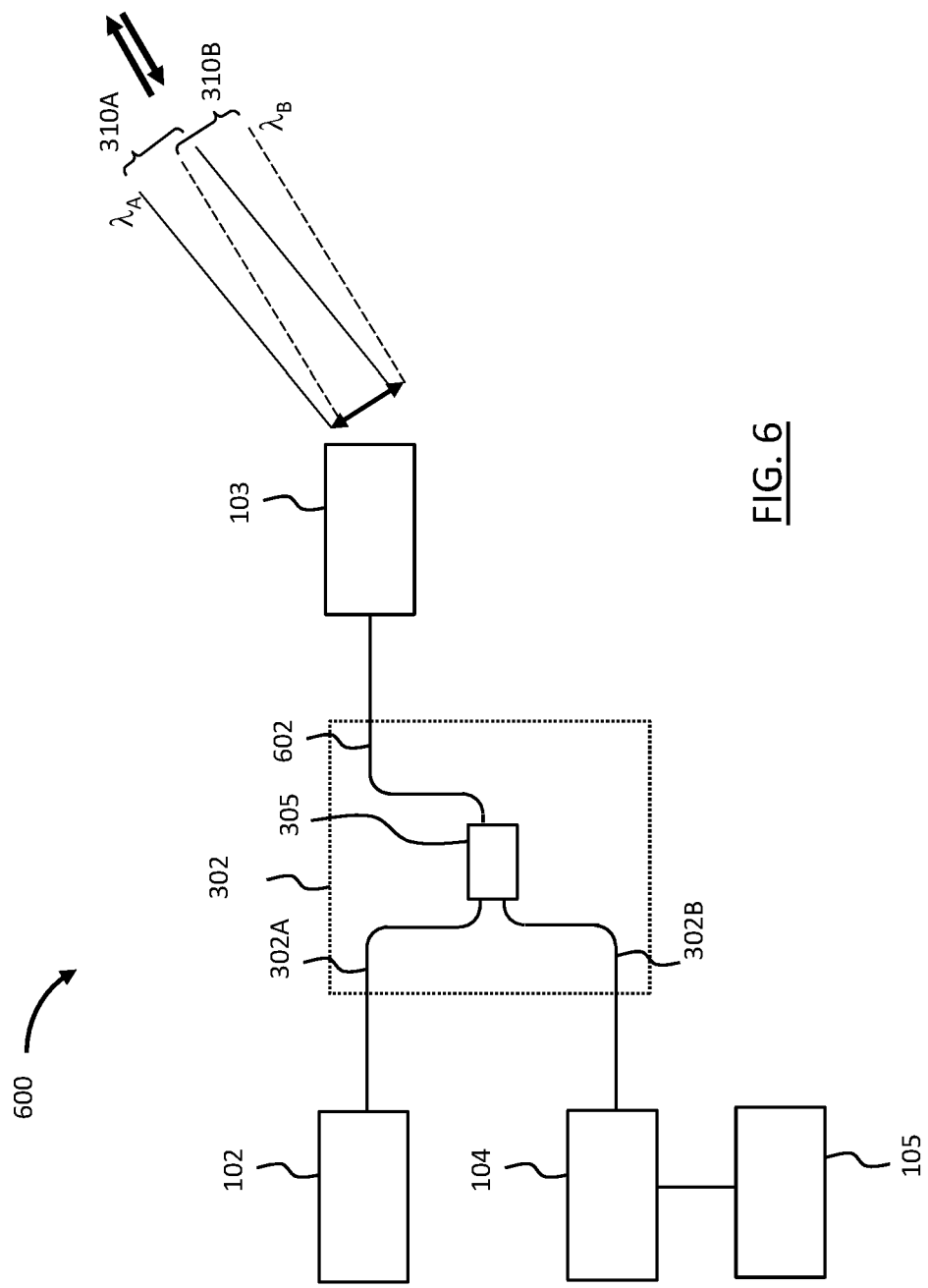
FIG. 6 illustrates another arrangement of a system to facilitate estimation of the spatial profile of an environment.

In one arrangement, as illustrated in FIG. 6, parts of the outbound fibre-optic route 302A and the inbound fibre-optic route 302B may be collocated. For example, the collocated fibre-optic route may be a double clad fibre 602, which includes a core, an inner cladding layer and an outer cladding layer. The core and inner cladding layer together act like a single-mode fibre having a smaller numerical aperture, whereas the inner cladding layer and the outer cladding layer together act like a multi-mode fibre having a larger numerical aperture. In this collocation arrangement 600, the double-clad fibre 602 is configured to transport light between the three-port element 305 and the expansion optics 304 illustrated in FIG. 3. The fibre-optic route between the light source 102 and the three-port element 305 still takes the form of a single-mode fibre 302A for transporting outgoing light 301, whereas the fibre-optic route between the light detector 104 and the three-port element 305 still takes the form of a multi-mode fibre 302B for transporting reflected light 303. Although the description on FIG. 6 relates to a fibre-optic variant, a skilled person would appreciate that without minor modifications the description may be applicable to other optical waveguide variants, such as an optical circuit variant.

The disclosure hereinbefore relates to facilitating estimation of a spatial profile by directing light over a first dimension (such as the vertical direction). The present disclosure also envisages extending to directing light over a second dimension, substantially perpendicular to the first dimension (such as the horizontal direction). In one arrangement, the angularly dispersive element 308 illustrated in the example of FIG. 3, which directs light in a first dimension based on its wavelength, may include an angularly adjustable reflective element to controllably reflect light over a second dimension perpendicular to the first dimension. The angular adjustment may be controlled by an optical positioning system. In one example, the optical positioning system is a microelectromechanical system (MEMS). The MEMS include an array of individually actuatable mirrors to reflect light. In another example, the optical positioning system is galvanometer scanning system. Compared to some other examples, the galvanometer scanning system is relatively compact. In yet another example, the optical positioning system is a polygonal scanning system. The polygonal scanning system includes a rotatable refractive element, such as a triangular or rectangular prism, or a rotatable reflective element such as a mirror, which upon rotation about an axis is configured to direct light over the second dimension at a scanning rate based on its rotational speed. In one form, a system for facilitating estimation of a spatial profile may be configured to direct light into two dimensions by controlling the wavelength channel for one dimension and adjusting the angle of the angularly adjustable reflective element for the other dimension. The processing unit 105 may be operatively coupled to both the light source 102 for wavelength control and the angularly adjustable reflective element for angular control.

In another arrangement, any one or more of the diffraction gratings 412A, 412B and 412C (hereinafter 412x) in any of FIGS. 4C, 4D, 4E, 4F and 4G may be controllably tilted about a tilting axis to direct the outgoing light in the second dimension perpendicular to the first dimension. The tilting axis may be substantially parallel to direction of light propagation. Where only one of the multiple diffraction gratings is controllably tilted, the diffraction grating to be controllably tilted may be the diffraction grating which light last passes before being directed into the environment 110. For example, in FIG. 4C, the diffraction grating 412C may be tilted about a tilting axis 414. In another example, in FIG. 4D, the diffraction grating 412C may be tilted about a tilting axis 414. In yet another example, in FIG. 4E, the diffraction grating 412C may be tilted about a tilting axis 414. In still yet another example, in FIG. 4F, the diffraction grating 412C may be tilted about a tilting axis 414. In still yet another example, in FIG. 4G, the diffraction grating 412B may be tilted about a tilting axis 414. A skilled person would appreciate that the tilting axis 414 may not necessarily pass through the centre of the diffraction grating 412x. For example, the tilting axis 414 may be offset from the centre of the diffraction grating 412x. Further, the tilting axis 414 may not necessarily pass through the diffraction grating 412x.

Figure 4H:
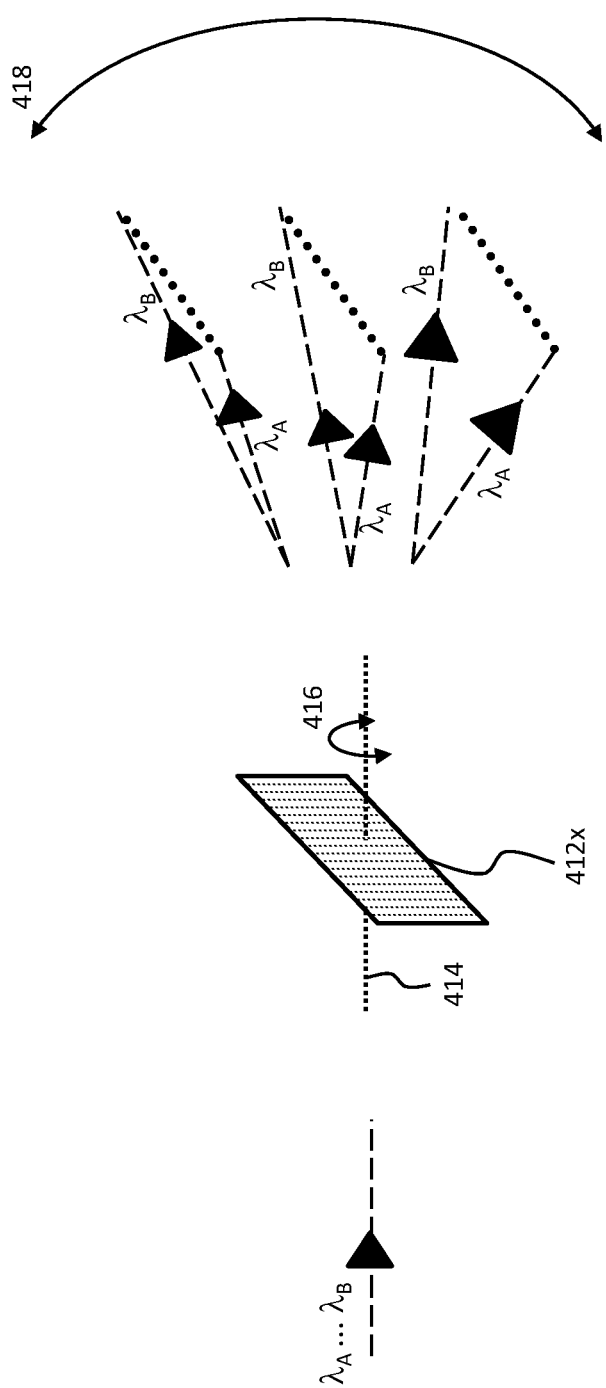
FIG. 4H illustrates a perspective view of an adjustably tiltable diffraction grating.
Figure 5:
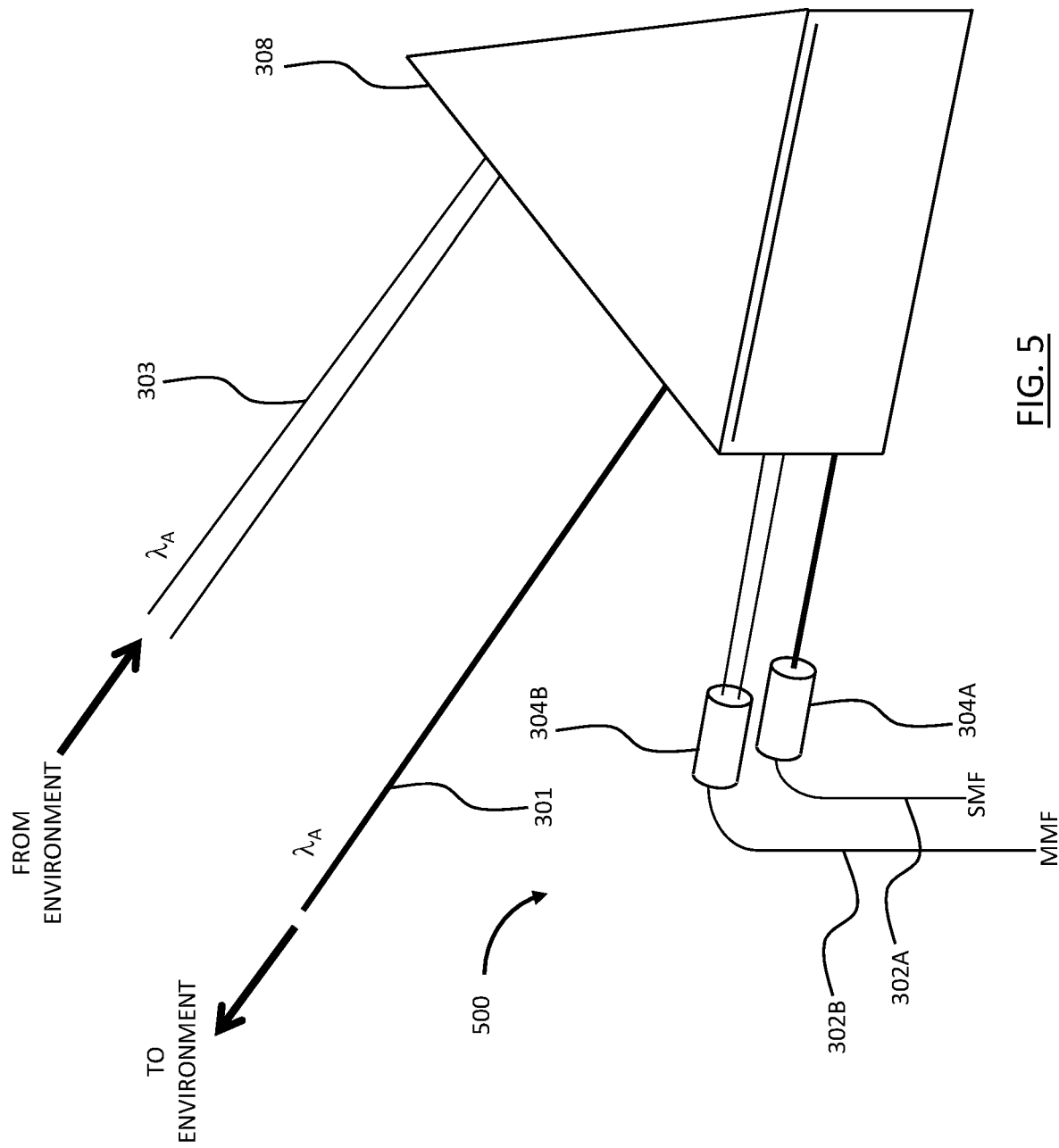
FIG. 5 illustrates the arrangement of the angularly dispersive element illustrated in FIG. 3 receiving and directing light at a selected wavelength channel.

As illustrated in FIG. 4H, the diffraction grating 412x is adjustably tiltable about the tilting axis 414, parallel to a direction of an input beam and/or perpendicular to the plane defined by the lines of the diffraction grating 412x. An adjustment of the tiltable angle 416 of the diffraction grating 412x causes a corresponding change in the output beam's direction 418 along the second dimension. The sensitivity (e.g. based on a comparison between a range of tiltable angles 416 of the diffraction grating 412x compared to a range of the directions 418 of the output beam) may range between approximately 0.5 to 2 degrees of output beam direction over the second dimension per degree of grating tilt. In one instance, beam direction over 80 degrees can be achieved by tilting a single diffraction grating by 40 degrees (i.e. a sensitivity of 2.0 degrees). In another instance, beam direction over 120 degrees can be achieved by tilting a single diffraction grating by 180 degrees (i.e. a sensitivity of 0.67 degrees).

Figure 4I:
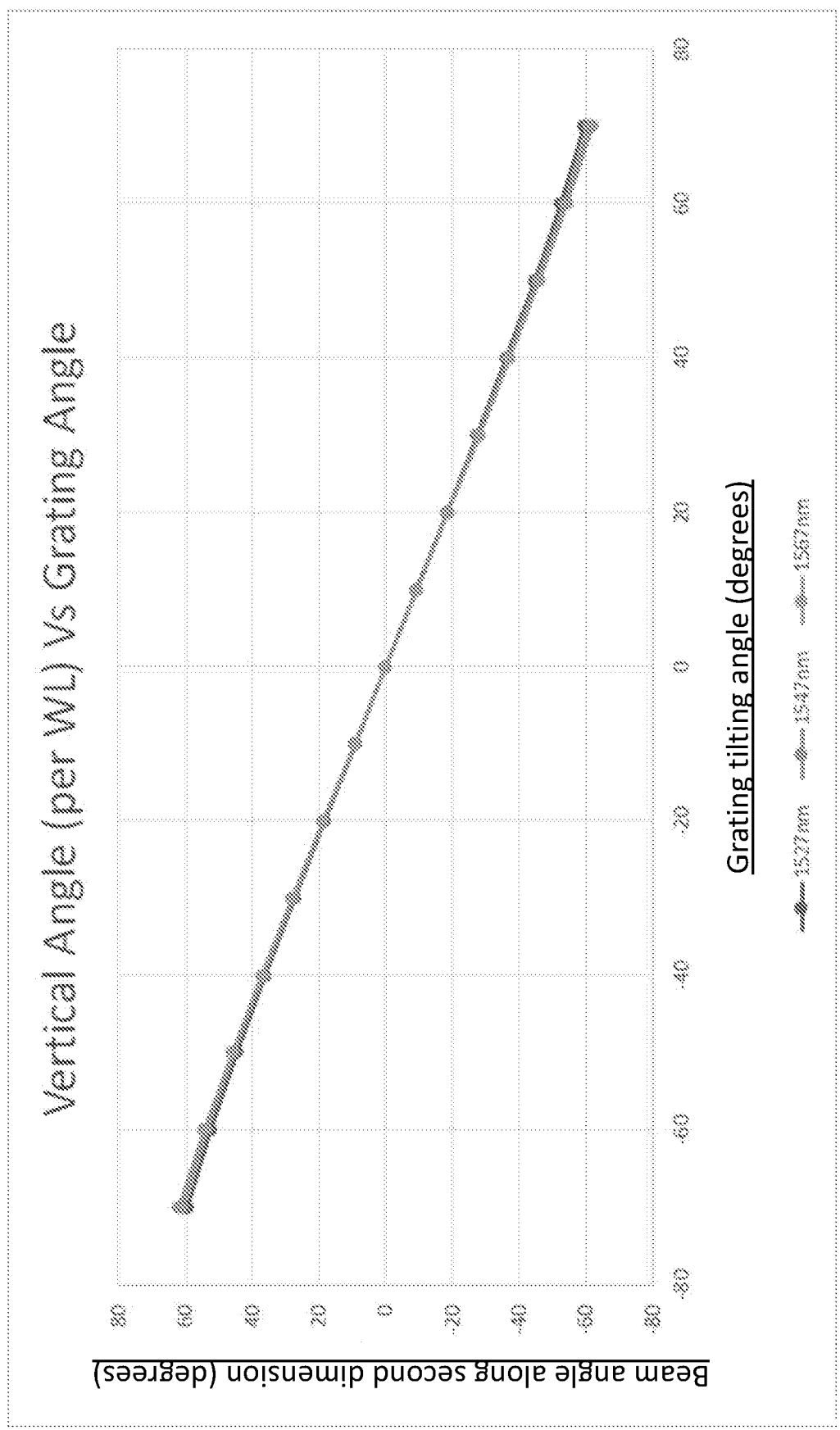
FIG. 4I illustrates a relationship between the grating tiltable angle and beam direction over the second dimension.
Figure 4J:
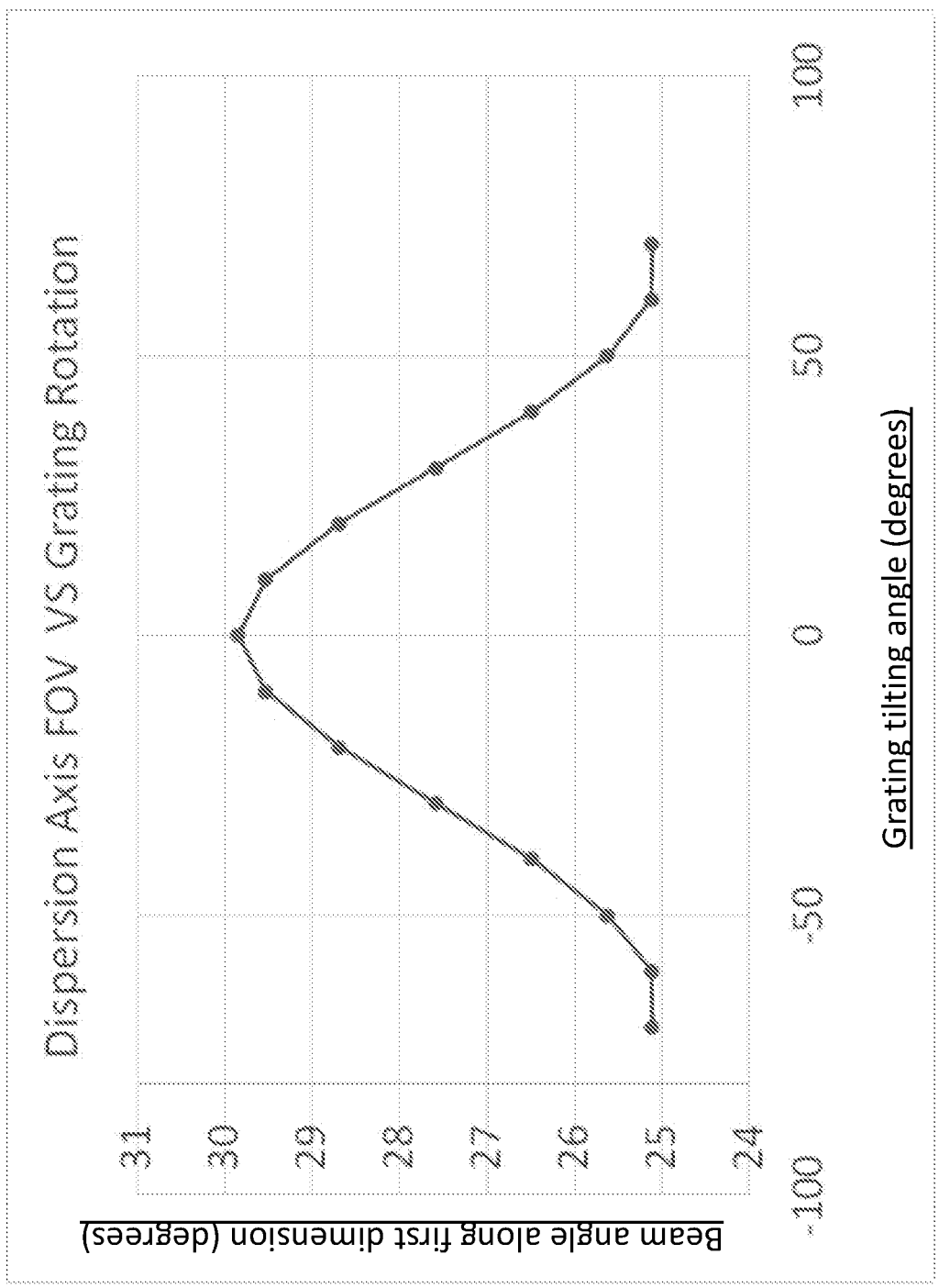
FIG. 4J illustrates a relationship between the grating tiltable angle and beam direction over the first dimension.

While a change in the grating tilt angle predominantly results in beam direction in the second dimension, it may also manifest in a, usually comparatively smaller, change in the beam direction over the first dimension (i.e. the wavelength dependent dimension). This manifestation may in one arrangement advantageously extend the range of the beam direction along the first dimension. For example, as illustrated in FIGS. 4I and 4J, an adjustment of the tiltable angle of the diffraction grating 412x over 140 degrees causes the output beam to be directed over 120 degrees along the second dimension (FIG. 4I), but over 5 degrees along the first dimension (FIG. 4J) out of 30 degrees total beam direction over the first dimension.

In one arrangement, the beam director 103 is configured to estimate the tiltable angle 416 based on the non-diffracted optical intensity through the tiltable diffraction grating 412x. Tilting the tiltable angle 416 about the tilting axis 414 of the tiltable diffraction grating 412x affects the efficiency of light diffraction towards the non-zero-th diffraction order(s) 430. The changes in this efficiency manifest in a variation in light intensity through the zero-th order 440 of the diffraction grating 412x. As illustrated in FIG. 4A, a photodetector 450 may be positioned in the path of the light 420 directed towards and beyond the diffraction grating 412x. The photodetector 450 measures intensity of light through a tiltable diffraction grating 412x along its zero-th order 440, based on which the tiltable angle 416 may be inferred. FIG. 4B illustrates an example of a relationship of a measure of the zero-th order optical intensity versus tiltable angle 416 of the tiltable diffraction grating 412x. The zero-th order optical intensity generally varies periodically, in a sinusoidal-like fashion, as the tiltable diffraction grating 412x is rotated about the axis 414. For example, successive local minima represent lowest optical intensities measured along the zero-th order. These local minima are separated by 180 degrees of rotation of the tiltable diffraction grating 412x. Using FIG. 4B as calibration, the tiltable angle 416 may be estimated based on a measurement of the zero-th order optical intensity.

Figure 7:
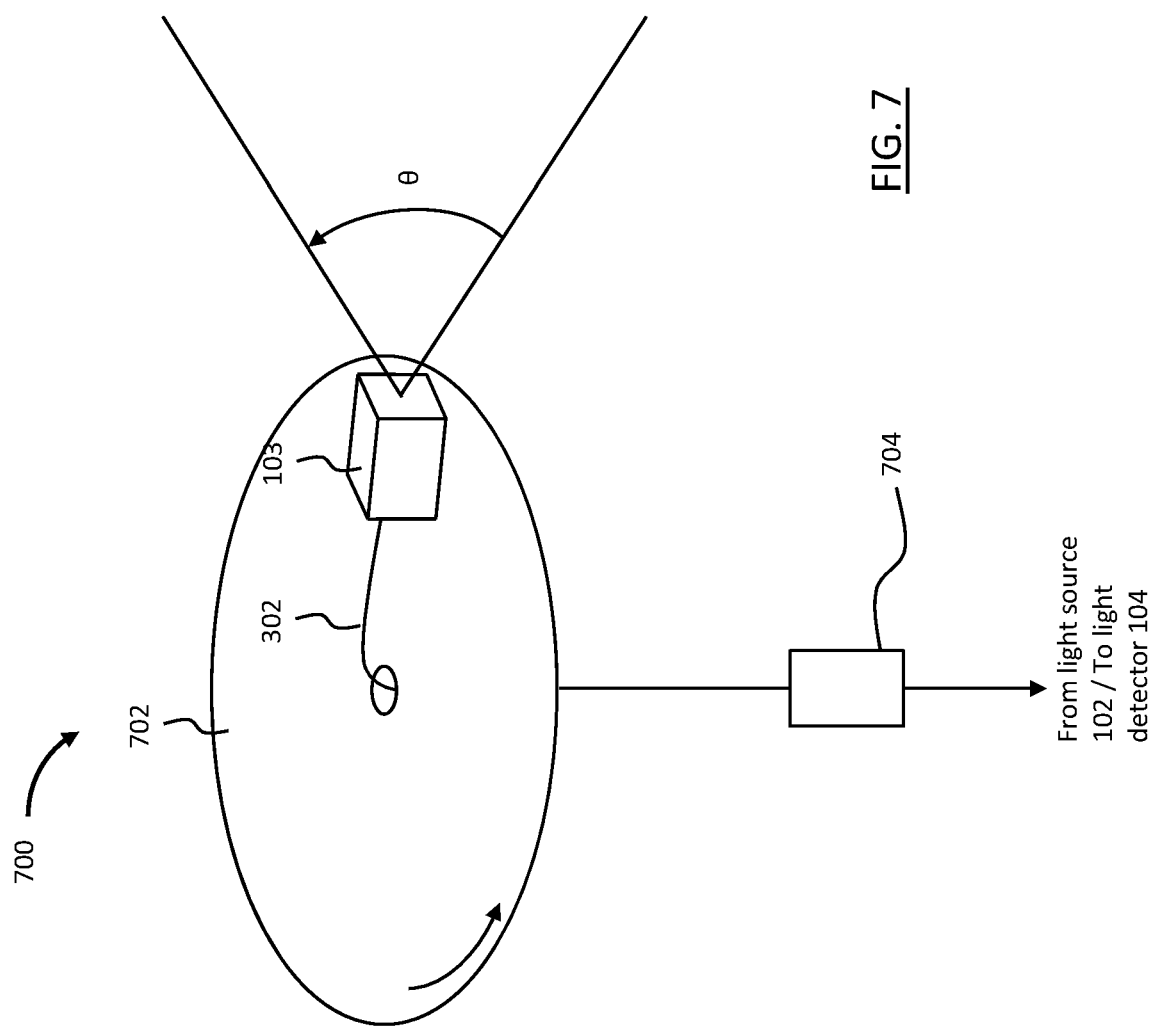
FIG. 7 illustrates another arrangement of a system to facilitate estimation of the spatial profile of an environment.

FIG. 7 shows partially another arrangement 700 of a system for facilitating estimation of a spatial profile by directing light over two dimensions. The system 700 includes a beam director 103 which in turns including the angularly dispersive element 308 or 408, respectively illustrated in FIGS. 3 and 4, which directs light in a first dimension (e.g. the vertical direction) based on its wavelength. In the system 700, the angularly dispersive element 308 or 408 is be mounted or otherwise supported on a rotatable support 702. The rotatable support 702 is rotatable over a second dimension (e.g. the horizontal direction) substantially perpendicular to the first dimension. The system 700 may include a slip ring 704 to mechanically and/or optically couple between the light transport assembly 302 and the light detector 104. In one form, a system for facilitating estimation of a spatial profile may be configured to direct light into two dimensions by controlling the wavelength channel for one dimension and adjusting the angle or rotation of the rotatable support 702 for the other dimension.

The processing unit 105 may be operatively coupled to both the light source 102 for wavelength control and the rotatable support 702 for angular or rotational control. In an alternative arrangement (not illustrated), the beam director 103 may rotate about an internal axis, rather than revolving around a rotational axis of a rotatable support. For example, the beam director 103 may rotate about the beam expansion optics 304, such as a pigtailed collimator, along a rotational axis that aligns with the direction of the expanded beam 306 in FIG. 3 or the expanded beam 406 in FIGS. 4A-4G.

Figure 8:
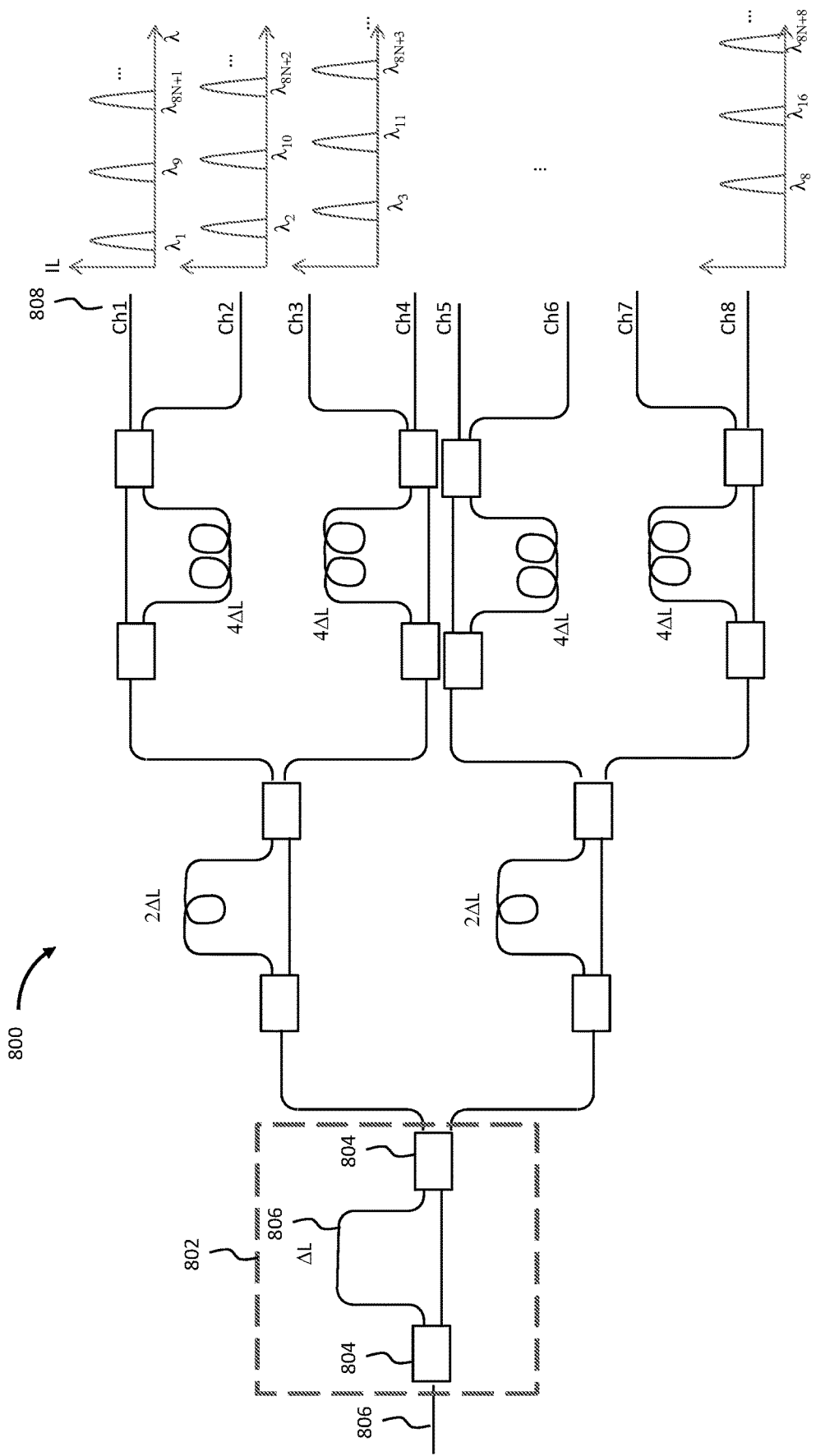
FIG. 8 illustrates an example of a spectral comb filter.
Figure 9:
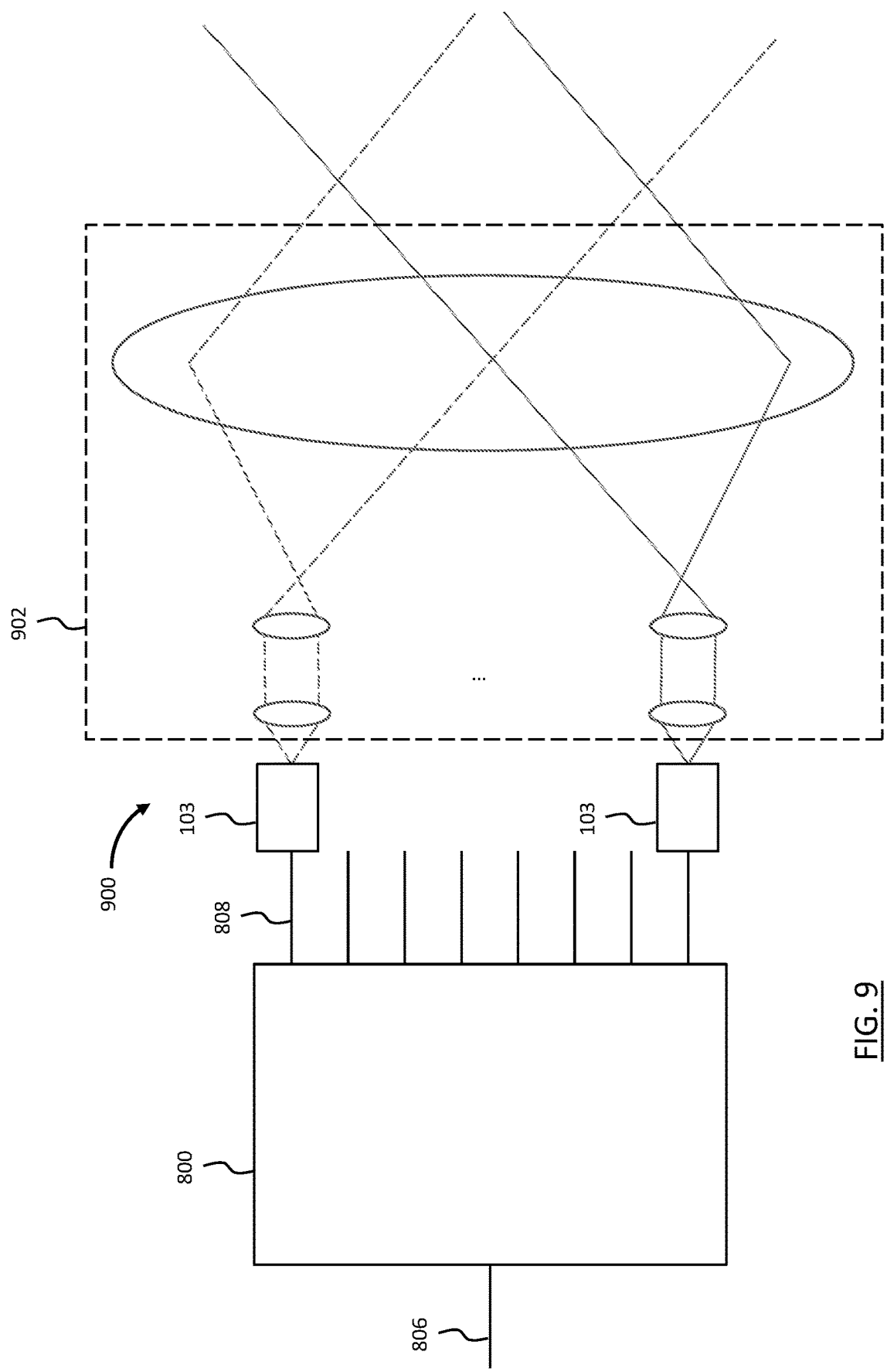
FIG. 9 illustrates another arrangement of a system to facilitate estimation of the spatial profile of an environment.

In another arrangement, a system for facilitating estimation of a spatial profile by directing light over two dimensions includes an optical interleaver having output ports (interleaving ports) spatially offset from an optical axis (e.g. of expansion optics) to provide light direction over a second dimension. FIG. 8 illustrates a spectral comb filter in the form of an optical interleaver 800 for porting light between an input (composite) port and one of N output ports (interleaving ports), where N=$2^x$ where x is a positive integer. In FIG. 8, N is 8. In another arrangement, N may be 2 or 16. The optical interleaver 800 includes multiple interferometric segments (e.g. 802) each including splitters 804 at the respective ends of the segment separated by two interferometric paths having an optical path difference 806. Each segment 802 in a branch is divided into two segments in the next branch. The optical path difference doubles from one branch to the next (e.g. $\Delta L$, $2\Delta L$, $4\Delta L$ . . . etc). The composite port 806 is configured to receive or provide light at any one of every N-th consecutive wavelength channels (e.g. $\lambda_1$, $\lambda_{N+1}$, $\lambda_{2N+1}$ . . . ) of the multiple wavelength channels. The N interleaving ports 808 are configured to respectively provide or respectively receive corresponding light at one of N groups of wavelength channels. FIG. 9 illustrates a system 900 including the optical interleaver 800, N beam directors 103 and expansion optics 902. The beam director 103 receives light from respective interleaving ports that are spatially offset over a second direction from an optical axis of the expansion optics 902. The beam directors 103 each direct the light over a first dimension (e.g. into and out of the page), whereas the expansion optics 902 angles the directed light from the beam directors 103 to be further directed over a second dimension (e.g. up and down the page). A skilled person would appreciate that, instead of or in addition to using the optical interleaver, other forms of a spectral comb filter, such as a Fabry-Perot resonators or a Mach-Zehnder interferometer, may be used.

In another arrangement, instead of using an optical interleaver 800, one or array of reflective elements, such as microelectromechanical systems or MEMS, may be used to provide light direction over a second dimension. The one or array of reflective elements may be configured to direct light towards the expansion optics 902 for collimation and expansion. This arrangement facilitates adjustment over continuous angles, rather than discrete angles as in the case for the optical interleaver 800, in the second dimension.

Now that arrangements of the present disclosure are described, it should be apparent to the skilled person in the art that at least one of the described arrangements have the following advantages:

The utilisation of the aperture size of the beam director is maximised regardless of the range or number of angles over which light is directed.

The one dimensional beam director may be added to a variety of different mechanical or optical systems to provide bean direction in a second direction.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A system for facilitating estimation of a spatial profile of an environment, the system including:
    a light source configured to provide light at selected one or more of multiple wavelength channels, the light having at least one time-varying attribute;
    a beam director including an angularly dispersive element, an aperture and configured to:
        spatially direct outgoing light through the aperture into the environment and receive at least part of the outgoing light reflected by the environment, the outgoing light to be directed through:
    the aperture in a first direction of multiple directions into the environment along a first dimension, the first direction corresponding to the outgoing light at a first selected wavelength channel; and
    the aperture in a second direction of the multiple directions into the environment along the first dimension, the second direction corresponding to the outgoing light at a second selected wavelength channel;
    wherein the angularly dispersive element includes at least one (1) diffraction grating or (2) refractive or reflective element adjustably tiltable or rotatable to direct the outgoing light along a second dimension substantially orthogonal to the first dimension;
    a light detector configured to detect the reflected light; and
    a processing unit configured to determine at least one characteristic associated with the at least one time-varying attribute of the reflected light for estimation of the spatial profile of the environment associated with the first direction and the second direction.

2. The system of claim 1 wherein the outgoing light at the first selected wavelength channel includes a substantially identical beam shape to that of the outgoing light at the second selected wavelength channel.

3. The system of claim 1 further comprising a light transport assembly configured to transport the outgoing light from the light source to the beam director and transport the reflected light from the beam director to the light detector, the light transport assembly including:
    an outbound guided-optic route between the light source and the beam director for carrying the outgoing light at the first and second selected wavelength channels; and
    an inbound guided-optic route between the beam director and the light detector for carrying the reflected light at the first and second selected wavelength channels.

4. The system of claim 3 wherein the inbound and outbound guided-optic routes are each selected from the group of: a fibre-optic route and an optical circuit route.

5. The system of claim 3 wherein the outbound guided-optic route is spatially separate from the inbound guided-optic route.

6. The system of claim 5 wherein the light transport assembly includes a single-mode fibre in the outbound guided-optic route and a multi-mode fibre in the inbound guided-optic route.

7. The system of claim 3 wherein the outbound guided-optic route spatially overlaps with the inbound guided-optic route.

8. The system of claim 7 wherein the light transport assembly includes a double-clad fibre in the spatially overlapped outbound and inbound guided-optic routes, the double-clad fibre associating with a first numerical aperture for the outbound guided-optic route and a second numerical aperture, larger than the first numerical aperture, for the inbound guided-optic route.

9. The system of claim 1 wherein the beam director includes a diffraction grating and the diffraction grating tilts or rotates about an axis substantially parallel to the outgoing light's propagation direction and/or perpendicular to a plane defined by lines of the diffracting grating.

10. The system of claim 9 wherein the at least one diffraction grating comprises three diffraction gratings arranged to turn the light in a clockwise or anti-clockwise path.

11. The system of claim 10 wherein the beam director includes one or more beam compensators and wherein at least one of the one or more beam compensators is located in between adjacent pairs of the three diffraction gratings.

12. The system of claim 1, wherein the beam director includes a spectral comb filter for porting light between a composite port and one of N interleaving ports, the composite port configured to receive or provide light at any one of every N-th consecutive wavelength channels of the multiple wavelength channels, the N interleaving ports configured to respectively provide or respectively receive corresponding light at one of N groups of the multiple wavelength channels.

13. The system of claim 12 wherein the N interleaving ports are each offset by a respective amount from an optical axis to provide a corresponding angular separation over the second dimension.

14. A system for facilitating estimation of a spatial profile of an environment, the system including:
a light source configured to provide light at selected one or more of multiple wavelength channels, the light having at least one time-varying attribute;
a beam director including one or more diffraction gratings and configured to:
spatially direct outgoing light through the one or more diffraction gratings into the environment and receive at least part of the outgoing light reflected by the environment, the outgoing light to be directed through:
the one or more diffraction gratings in a first direction of multiple directions into the environment along a first dimension, the first direction corresponding to the outgoing light at a first selected wavelength channel; and
the one or more diffraction gratings in a second direction of the multiple directions into the environment along the first dimension, the second direction corresponding to the outgoing light at a second selected wavelength channel, any one or more of the one or more diffraction gratings being adjustably tiltable to direct light along a second dimension substantially orthogonal to the first dimension;
a light detector configured to detect the reflected light; and
a processing unit configured to determine at least one characteristic associated with the at least one time-varying attribute of the reflected light for estimation of the spatial profile of the environment associated with the first direction and the second direction.

15. The system of claim 1, wherein the beam director is configured to direct the outgoing light through a first portion of the aperture in the first direction and through a second portion of the aperture in the second direction, the second portion spatially overlapping with the first portion.

16. The system of claim 15 wherein the second portion spatially overlaps with the first portion between 50% and 90% in area and wherein the beam director is configured to receive the reflected light at the first selected wavelength channel through a third portion of the aperture, and receive the reflected light at the second selected wavelength channel through a fourth portion of the aperture, the third portion of the aperture spatially overlapping with the fourth portion of the aperture.

17. The system of claim 16 wherein the first, second, third and fourth portions of the aperture are spatially overlapping with one another.

18. The system of claim 1 including a polygonal scanning system that includes a rotatable refractive or reflective element, to direct the outgoing light over the second dimension at a scanning rate based on its rotational speed, and wherein the system is configured to direct light into two dimensions by controlling the first selected wavelength channel for the first dimension and a rotational angle of the rotatable refractive or reflective element for the second dimension.

19. The system of claim 1, wherein the beam director includes expansion optics to produce an expanded beam in free space form for each of the first selected wavelength channel and the second selected wavelength channel and wherein the angularly dispersive element is configured to receive the expanded beams and direct them into the first and second directions respectively.

20. A system for facilitating estimation of a spatial profile of an environment, the system including:
a light source configured to provide light at selected one or more of multiple wavelength channels, the light having at least one time-varying attribute;
a beam director including one or more rotatable refractive or reflective elements and configured to:
spatially direct outgoing light via the one or more rotatable refractive or reflective elements into the environment and receive at least part of the outgoing light reflected by the environment, the outgoing light to be directed via:
the one or more rotatable refractive or reflective elements in a first direction of multiple directions into the environment along a first dimension, the first direction corresponding to the outgoing light at a first selected wavelength channel; and
the one or more rotatable refractive or reflective elements in a second direction of the multiple directions into the environment along the first dimension, the second direction corresponding to the outgoing light at a second selected wavelength channel, any one or more of the one or more rotatable refractive or reflective elements being adjustably tiltable to direct light along a second dimension substantially orthogonal to the first dimension;
a light detector configured to detect the reflected light; and
a processing unit configured to determine at least one characteristic associated with the at least one time-varying attribute of the reflected light for estimation of the spatial profile of the environment associated with the first direction and the second direction.

* * * * *